(12) United States Patent
Martin et al.

(10) Patent No.: US 12,206,224 B2
(45) Date of Patent: Jan. 21, 2025

(54) MOBILE SUBSTATION SYSTEM FOR FRACTURING OPERATIONS

(71) Applicant: TYPHON TECHNOLOGY SOLUTIONS (U.S.), LLC, The Woodlands, TX (US)

(72) Inventors: Johnny Martin, The Woodlands, TX (US); David Loyd, The Woodlands, TX (US); Theron South, The Woodlands, TX (US)

(73) Assignee: TYPHON TECHNOLOGY SOLUTIONS (U.S.), LLC, The Woodlands, TX (US)

( * ) Notice: Subject to any disclaimer, the term of this patent is extended or adjusted under 35 U.S.C. 154(b) by 0 days.

(21) Appl. No.: 18/615,038

(22) Filed: Mar. 25, 2024

(65) Prior Publication Data

US 2024/0235170 A1    Jul. 11, 2024

Related U.S. Application Data

(63) Continuation of application No. 18/083,457, filed on Dec. 16, 2022, now Pat. No. 11,955,782.

(60) Provisional application No. 63/421,245, filed on Nov. 1, 2022.

(51) Int. Cl.
*H02B 7/00*     (2006.01)
*E21B 43/26*    (2006.01)
*F04B 17/03*    (2006.01)
*H02B 13/00*    (2006.01)

(52) U.S. Cl.
CPC ........... *H02B 7/00* (2013.01); *E21B 43/2607* (2020.05); *F04B 17/03* (2013.01); *H02B 13/00* (2013.01)

(58) Field of Classification Search
CPC ....... H02B 7/00; H02B 13/00; E21B 43/2607; F04B 17/03
See application file for complete search history.

(56) References Cited

U.S. PATENT DOCUMENTS

2022/0136489 A1\* 5/2022 Fisher ..................... F04B 15/02
                                                               417/53
2022/0385074 A1\* 12/2022 Hinderliter ............... H02J 7/34

\* cited by examiner

*Primary Examiner* — James G Sayre
(74) *Attorney, Agent, or Firm* — GREENBERG TRAURIG, LLP; Dwayne L. Mason; Jordan A. Lewis

(57) ABSTRACT

A method and system are disclosed for providing electrical power from a utility electric grid to a fracturing operation, and an electrically powered fracturing system. A mobile substation includes at least two transformer units that are operatively coupled to the utility electric grid in a parallel orientation, wherein the transformer units are capable of receiving power from the utility electric grid and stepping down the power for delivery to a switchgear. An electric motor is operatively coupled to a hydraulic fracturing pump and operatively controlled by a variable frequency drive. At least one open air relay cable is operatively coupled between the switchgear and the electric motor and capable of delivering power to the electric motor.

20 Claims, 21 Drawing Sheets

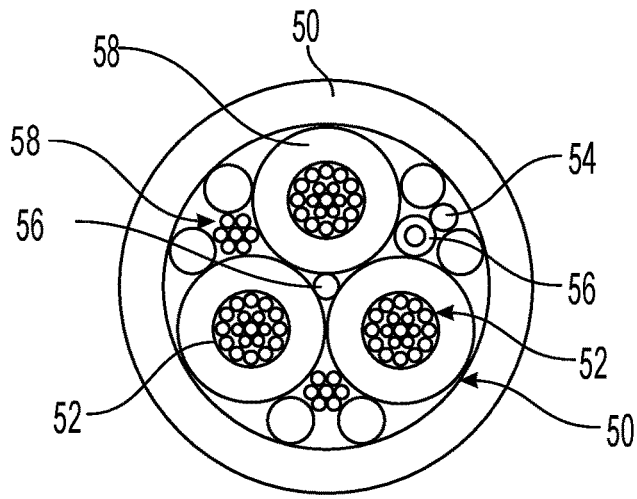

2/0 3/C 15KV SHD-GC+FO RED TPU

|  |  | TYPICAL |
|---|---|---|
| Conductor: | 2/0 AWG 323W Class I Tinned Copper | OD: 0.455" |
| Conductor Shield: | 0.015" Extruded Semi-Conducting Cross Linked Compound. | OD: 0.487" |
| Insulation | 0.215" (Min. AVG.) of Ethylene Propylene Rubber (EPR). | OD: 0.917" |
| Braid Shield: | Semi-Conducting Tape Helically Applied and Lapped. Composite Braid of 0.0126" Tin-Coated Copper Wires and Colored Nylon Yarn (Black, White/Blue, Red) Providing a Minimum of 60% Copper Coverage. | OD: 0.965" |
| Grounds (2): | 3 AWG 259W Class H Tinned Copper. | OD: 0.284" |
| Control Group: | | |
| Ground Check: | 8 AWG 133W Class H Tinned Copper with 0.045" (Min. AVG.) of Yellow Gexol. | OD: 0.256" |
| Fiber Optic Assembly: | 6 Channel Multimode, OC-0030322 62.5/125mm Fiber Optic and Ground Check are Cabled Together and Bound with a Polyester Tape, 84% Coverage of 0.0063" Tinned Copper Braid and a Blue RFSF Tape. | OD: 0.185" |
| Filler: | Rubber as Required to Create an Essentiallly Round Cross Section. | |
| Core Binder: | Reverse/Open Wraps of a Polypropylene twine. | |
| Jacket: | Appx.0.250" (Min. AVG) of Red TPU. | OD: 2.650" |
| Voltage Rating: | 15000 Volts | |
| Appx Weight: | 4342 Pounds Per 1000 Feet. | |

FIG. 18

MOBILE SUBSTATION SYSTEM FOR FRACTURING OPERATIONS

RELATED APPLICATIONS

This application is a continuation of U.S. Nonprovisional patent application Ser. No. 18/083,457 filed Dec. 16, 2022, which claims the benefit, and priority benefit, of U.S. Provisional Patent Application Ser. No. 63/421,245, filed Nov. 1, 2022, the disclosure and contents of which are incorporated by reference herein in their entirety.

BACKGROUND

1. Field of Invention

The presently disclosed subject matter relates generally to hydraulic stimulation of underground hydrocarbon-bearing formations, and more particularly, to the use of electrical grid power to power equipment for delivering fracturing fluid to a wellbore.

2. Description of the Related Art

During the life span of a typical hydrocarbon-producing wellbore, various fluids (along with additives, proppants, gels, cement, etc. . . . ) can be delivered to the wellbore under pressure and injected into the wellbore. Surface pumping systems must be able to accommodate these various fluids. Such pumping systems are typically mobilized on skids or tractor-trailers with associated motors to power the pumping operation.

In the past, diesel powered equipment has been utilized, or on-site power sources such as turbine generators have been utilized, to supply power to electric motors and pumps used for fracturing operations; however, these types of equipment or dedicated, on-site power sources have a number of disadvantages.

For example, diesel powered equipment, or fuel oil, is costly and will incur a high running cost due to the costly price of the fuel. Another disadvantage attributed to diesel powered equipment is that it is unable to operate efficiently under prolonged overload conditions and surge equipment high noise levels that exceed 88 decibels limiting human exposure. Moreover, diesel powered equipment generally generates small amount of power with an additional high cost of lubrication. Finally, diesel powered equipment requires expensive maintenance charges.

Improvements in this field of technology are desired.

SUMMARY

Various illustrative embodiments of a system and method for utilizing electrical power from a utility electric grid for powering equipment for delivering fracturing fluid to a wellbore at a fracturing operation, or in connection with other hydrocarbon-producing wellbore completions, are provided herein.

In accordance with an aspect of the disclosed subject matter, a system is provided for performing hydraulic fracturing using power from a utility electric grid. The system can include: a mobile substation comprising at least two transformer units that are operatively coupled to the utility electric grid in a parallel orientation, where the transformer units are capable of receiving power from the utility electric grid and stepping down the power for delivery to a switchgear; an electric motor operatively coupled to a hydraulic fracturing pump and operatively controlled by a variable frequency drive; and at least one open air relay cable operatively coupled between the switchgear and the electric motor and capable of delivering power to the electric motor.

In certain illustrative embodiments, a system is provided for performing hydraulic fracturing using power from a utility electric grid. The system can include: a mobile substation comprising at least two transformer units that are operatively coupled to the utility electric grid in a parallel orientation, where the transformer units are capable of receiving power from the utility electric grid and stepping down the power for delivery to a plurality of switchgears; a plurality of electric motors, where each electric motor is operatively coupled to a hydraulic fracturing pump and operatively controlled by a variable frequency drive, and wherein each electric motor is coupled to one of the plurality of switchgears by at least one open air relay cable. In accordance with another aspect of the disclosed subject matter, a method is provided for performing hydraulic fracturing using power from a utility electric grid, including: accessing power from the utility electric grid; operating at least two transformer units in parallel to step down the line voltage of the power from the utility electric grid; passing the power from the at least two transformer units through a switchgear; delivering the power from the switchgear to a plurality of electric motors using at least one open air relay cable; and with each of the plurality of electric motors, driving a hydraulic fracturing pump.

In certain illustrative embodiments, a method of providing electric power to at least one fracturing unit at a wellbore is disclosed. The method can include: providing a pair of mobile substations at a site containing a wellbore to be fractured, wherein the mobile substations each comprise a transformer unit; operating the transformer units in the pair of mobile substations in parallel to receive power from a utility electric grid and step down the line voltage of the power from the utility electric grid to produce an electric power supply; providing the fracturing unit at the site; providing a fracturing fluid for pressurized delivery to the wellbore, wherein the fracturing fluid comprises a liquefied petroleum gas; and operating the fracturing unit using electric power from the electric power supply to pump the fracturing fluid to the wellbore In certain illustrative embodiments, the parallel orientation may include providing redundancy between the at least two mobile substations and at least one auxiliary power trailer in an event of malfunction of one of the mobile substations of the at least two mobile substations or electrical generation failure; and automatically delivering at least 60 MW to the plurality of electric motors in an absence of a controller, where automatically delivering at least 60 MW ensures that load requirement is equally shared between the at least two transformers. In certain illustrative embodiments, the system may further include performing hydraulic fracturing using power from the utility electric grid. In certain illustrative embodiments, the at least one open air relay cable is capable of delivering power to the plurality of electric motors. In certain illustrative embodiments, the system may further include powering the plurality of electric motors using power from the utility electric grid. In certain illustrative embodiments, the at least one fracturing pump may include at least one hydraulic fracturing pump. In certain illustrative embodiments, the at least two transformer units are capable of stepping down the power for delivery to a switchgear. In certain illustrative embodiments, the system may further include a well site comprising a wellbore and a source of electricity consisting of the utility electric grid. In certain illustrative embodiments, the system may further include a source of treatment fluid, where the treatment fluid may include a liquefied petroleum gas. In certain illustrative embodiments, the system may further include a control system for regulating a plurality of electorally powered fracturing units in delivery of a treatment fluid from a source of treatment fluid to a wellbore. In certain illustrative embodiments, the system may further include at least one pump trailer at a well site for housing the plurality of electric motors, the at least one fracturing pump and the at least one variable frequency drive. In certain illustrative embodiments, the system may further include an AC permanent magnet motor capable of operation in the range of up to 800 rpms and up to 25 ft/lbs of torque and at 2000 hp during fracturing operations. In certain illustrative embodiments, the system may further include a plunger-style fluid pump coupled to at least one magnet motor. In certain illustrative embodiments, the at least one magnet motor and the plunger-style fluid pump are each solely powered by power accessed from the utility electric grid. In certain illustrative embodiments, the method may further include providing the fracturing fluid for pressurized delivery to a wellbore, where the fracturing fluid comprises one or more fluids from the group of linear gelled water, gelled water, gelled oil, slick water, slick oil, poly emulsion, foam/emulsion, liquid $CO_2$, $N_2$, binary fluid and acid. In certain illustrative embodiments, the method may further include providing an electric blender module, the electric blender module comprising: a fluid source, a fluid additive source, and a blender tub.

In certain illustrative embodiments, a system is provided. The system can be used for, e.g., performing hydraulic fracturing using power from a utility electric grid. The system can include: a plurality of mobile substations, each mobile substation comprising at least two transformer units that are operatively coupled to a utility electric grid, wherein the at least two transformer units are configured to operate in a parallel orientation; a plurality of electric motors, each electric motor operatively coupled to at least one fracturing pump and operatively controlled by at least one variable frequency drive; and at least one open air relay cable operatively coupled between at least one switchgear and the plurality of electric motors. The at least one variable frequency drive can be configured to automatically deliver at least 60 MW to the plurality of electric motors in an absence of a controller, and automatically delivering at least 60 MW ensures that the load requirement is equally shared between the at least two transformer units operating in the parallel orientation. There can be redundancy between the at least two mobile substations and at least one auxiliary power trailer in an event of malfunction of one of the at least two mobile substations or electrical generation failure. The system can include a fracturing pump configured to perform hydraulic fracturing using power from the utility electric grid. The at least one open air relay cable can be configured to deliver power to the plurality of electric motors. The plurality of electric motors can be configured to drive the fracturing pump using power from the utility electric grid. The at least one fracturing pump can include at least one hydraulic fracturing pump. The transformer units can be configured to step down the power for delivery to a switchgear. The system can further include a well site comprising a wellbore and a source of electricity consisting of the utility electric grid. The system can further include a source of treatment fluid, wherein the treatment fluid comprises a liquefied petroleum gas. The system can further include a control system, wherein the control system is configured to regulate a plurality of electrically powered fracturing units in delivery of a treatment fluid from a source of treatment fluid to a wellbore. The system can further include at least one pump trailer at a well site for housing the plurality of electric motors, the at least one fracturing pump and the at least one variable frequency drive. The system can further include an AC permanent magnet motor configured to operate in the range of up to 800 rpms and up to 25 ft/lbs of torque and at 2000 hp during fracturing operations. The system can further include a plunger-style fluid pump coupled to at least one magnet motor, and wherein the at least one magnet motor and the plunger-style fluid pump are each solely powered by power accessed from the utility electric grid. The system can further include at least one fracturing unit configured to deliver pressurized liquefied petroleum gas to a wellbore.

In certain illustrative embodiments, a system is provided. The system can be used for, e.g., performing hydraulic fracturing using power from a utility electric grid. The system can include: a well site comprising a wellbore and a source of electricity consisting of a utility electric grid; a plurality of mobile substations, each mobile substation comprising at least two transformer units that are operatively coupled to the utility electric grid, wherein the at least two transformer units are configured to operate in a parallel orientation; a plurality of electrically powered fracturing units operatively associated with the utility electric grid, the electrically powered fracturing unit comprising at least one electric motor and at least one fluid pump coupled to the at least one electric motor, wherein the at least one electric motor is operatively coupled to a plurality of fracturing pumps and automatically controlled by at least one variable frequency drive, and wherein the at least one electric motor comprises an AC permanent magnet motor capable of operation in the range of up to 800 rpms and up to 25 ft/lbs of torque and at 2000 hp during fracturing operations; at least one open air relay cable operatively coupled between a plurality of switchgears and the at least one electric motor; a source of treatment fluid; a control system for regulating the plurality of electrically powered fracturing units in delivery of the treatment fluid from the source of treatment fluid to the wellbore; and a pump trailer at the well site for housing the at least one electric motor, the plurality of fracturing pump and the at least one variable frequency drive. The at least one variable frequency drive can be configured to automatically deliver at least 60 MW to the plurality of electric motors in an absence of a controller, and automatically delivering at least 60 MW ensures that load requirement is equally shared between the at least two transformer units operating in the parallel orientation. The system can have redundancy between the at least two mobile substations and at least one auxiliary power trailer in an event of malfunction of one of the at least two mobile substations or electrical generation failure. The at least one open air relay cable can be capable of delivering power to the plurality of electric motors. The treatment fluid can include a liquefied petroleum gas. The control unit can be configured to provide independent control of the plurality of mobile substations operating in parallel. The system can further include an AC permanent magnet motor capable of operation in the range of up to 800 rpms and up to 25 ft/lbs of torque and at 2000 hp during fracturing operations, and a plunger-style fluid pump coupled to the at least one electric motor.

In certain illustrative embodiments, a method is provided. The method can be used for, e.g., performing hydraulic fracturing using power from a utility electric grid. Power can be accessed from a utility electric grid. At least two transformer units can be operated in parallel to step down the line voltage of the power from the utility electric grid. The power can be passed from the at least two transformer units through at least one switchgear. The power can be delivered from the at least one switchgear to a plurality of electric motors using at least one open air relay cable. A plurality of pumps can be driven with the plurality of electric motors. Hydraulic fracturing can be performed using power from the utility electric grid. The plurality of pumps can include a plurality of electric pumps. When the at least two transformer units are operated in parallel, redundancy can be provided between the at least two mobile substations and at least one auxiliary power trailer in an event of malfunction of one of the mobile substations of the at least two mobile substations or electrical generation failure. At least 60 MW can be automatically delivered to the plurality of electric motors in an absence of a controller, wherein automatically delivering at least 60 MW ensures that load requirement is equally shared between the at least two transformer units. A fracturing fluid can be provided for pressurized delivery to a wellbore, wherein the fracturing fluid can include one or more fluids from the group of linear gelled water, gelled water, gelled oil, slick water, slick oil, poly emulsion, foam/emulsion, liquid $CO_2$, $N_2$, binary fluid and acid. An electric blender module can also be provided. The electric blender module can include a fluid source, a fluid additive source, and a blender tub. The at least one fracturing unit can be utilized for delivering pressurized liquefied petroleum gas to a wellbore.

In certain illustrative embodiments, a method is provided. The method can be used for, e.g., performing hydraulic fracturing using power from a utility electric grid. A source of electric power can be provided at a site containing a wellbore to be fractured. The source of electrical power is a utility electric grid. One or more electric fracturing units can be provided at the site. The electric fracturing units can include an electric motor and a coupled fluid pump, the electric motor operatively associated with the source of electric power. A fracturing fluid can be provided for pressurized delivery to a wellbore, wherein the fracturing fluid can include one or more fluids from the group of linear gelled water, gelled water, gelled oil, slick water, slick oil, poly emulsion, foam/emulsion, liquid $CO_2$, $N_2$, binary fluid and acid. At least two transformer units can be provided at a site containing a wellbore to be fractured, wherein the at least two transformer units are housed in one or more mobile substations. The at least two transformer units can be operated in parallel to receive power from a utility electric grid and step down the line voltage of the power from the utility electric grid to produce an electric power supply. One or more pump trailers can be provided at the site. The pump trailers can include an electric motor and a coupled fluid pump, the electric motor operatively associated with the electric power supply. The fracturing fluid can be provided for pressurized delivery to a wellbore. The electric motor can be operated using the electric power supply to pump the fracturing fluid to the wellbore. An electric blender module can be provided. The electric blender module can include a fluid source, a fluid additive source, and a blender tub. Electric power can be supplied to the electric blender module from the electric power supply to effect blending of a fluid from the fluid source with a fluid additive from the fluid additive source to generate the fracturing fluid.

Other aspects and features of the presently disclosed subject matter will become apparent to those of ordinary skill in the art upon review of the following detailed description in conjunction with the accompanying figures.

BRIEF DESCRIPTION OF THE DRAWINGS

A better understanding of the presently disclosed subject matter can be obtained when the following detailed description is considered in conjunction with the following drawings and figures, wherein:

FIG. 18 is a cross-sectional view of a communication cable with fiber optics and protection elements, in accordance with certain illustrative embodiments described herein;

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter generally relates to a system and method for utilizing electrical power from a utility electric grid to power equipment for delivering fracturing fluid to a wellbore at a fracturing operation, or in connection with other hydrocarbon-producing wellbore completions.

Each and every principle, methodology and/or system arrangement detailed herein may be utilized with one or more principles, methodology(ies) and/or system arrangement(s) detailed in one or more of: U.S. Pat. Nos. 11,359,462; 11,391,133; and 11,851,998.

Overview

In certain illustrative embodiments, the presently disclosed system and method can be used to perform hydraulic fracturing or other operations at a wellbore using utility grid powered electrical equipment, while also meeting all regulatory standards as provided in IEEE, ANSI C2, NEMA, and NFPA 70 for utilizing grid power.

Figure 1:
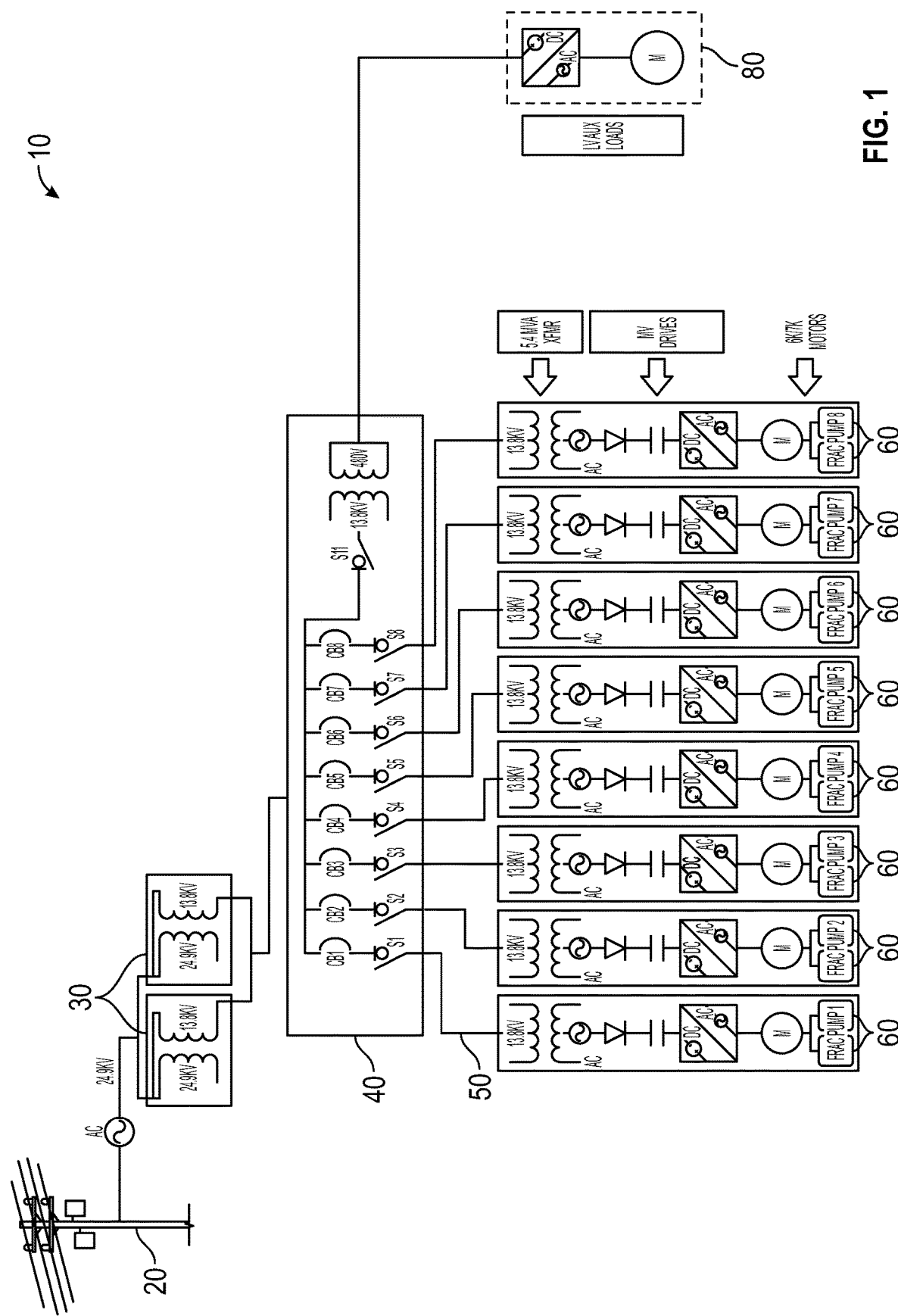
FIG. 1 is a block diagram of an exemplary electric grid power using at least one mobile substation, in accordance with certain illustrative embodiments described herein.

With reference to the illustrative embodiment of FIG. 1, a system 10 is provided. System 10 includes a utility electric grid 20 and related structures and equipment, a plurality of mobile power substations 30, a switchgear trailer 40, at least one relay cable 50 operatively connected to switchgear trailer 40, at least one pump trailer 60, and an auxiliary trailer 80. In certain illustrative embodiments, each trailer in system 10 can also be a skid. Each pump trailer 60 can include an electric motor 68 and at least one fluid pump 70 coupled thereto. During fracturing, mobile power substations 30 can be operatively associated with utility electric grid 20 to receive electric power therefrom. Electric power from utility electric grid 20 can be used to operate electric motor 68 and one or more fluid pumps 70 such as fracturing pumps (e.g., hydraulic fracturing pumps) to pump fracturing fluid directly to the wellbore.

In certain illustrative embodiments, the presently disclosed system and method allow for electric syncing of the mobile power substations 30 (which comprise two 30 MVA transformers configured to operate in parallel and powered by the utility electric grid 20), to a switchgear trailer 40 having a switchgear 40a on one buss network that is connected to a plurality of remotely controlled distributions and output bays and designed to energize a plurality of medium voltage/low voltage transformers 32a-32d located on pump trailers 60.

In certain illustrative embodiments, each single medium voltage transformer 32n on a pump trailer 60 has multiple secondary windings, designed to achieve IEEE 513 standards for THD (Total Harmonic Distortion) and configured to electrically power a single medium voltage double shafted motor on pump trailer 60. This medium voltage motor supplies the energy to operate one or more fracturing pumps to achieve efficient down hole fracturing operations.

In certain illustrative embodiments, the use of two 30 MVA mobile substations 30 operating in parallel provides a redundancy in the event of malfunction of one of the mobile substations 30 or electrical generation failure. The presently disclosed system and method allow a user to reach electrical capacity to fully utilize the switchgear trailer 40 and its distributions to reach fracturing pump capacity and maximize fracturing pump design in horsepower rating to reach desired efficiencies.

Utilizing Power from Utility Electric Grid

In certain illustrative embodiments, the utility electric grid 20 and its related structures and equipment are utilized as a single power source for fracturing operations. While traditional on-site power sources such as turbine generators may be accessible in certain fracturing operations, the use of utility grid power as a single power source, meaning the only power supply for on-site equipment during standard operations, is preferred. In certain embodiments, the use of utility grid power as the signal power source can supply sufficient power to operate a fleet of power substations 30, switchgear trailers 40, pump trailers 60, and auxiliary trailers 80.

Figure 2:
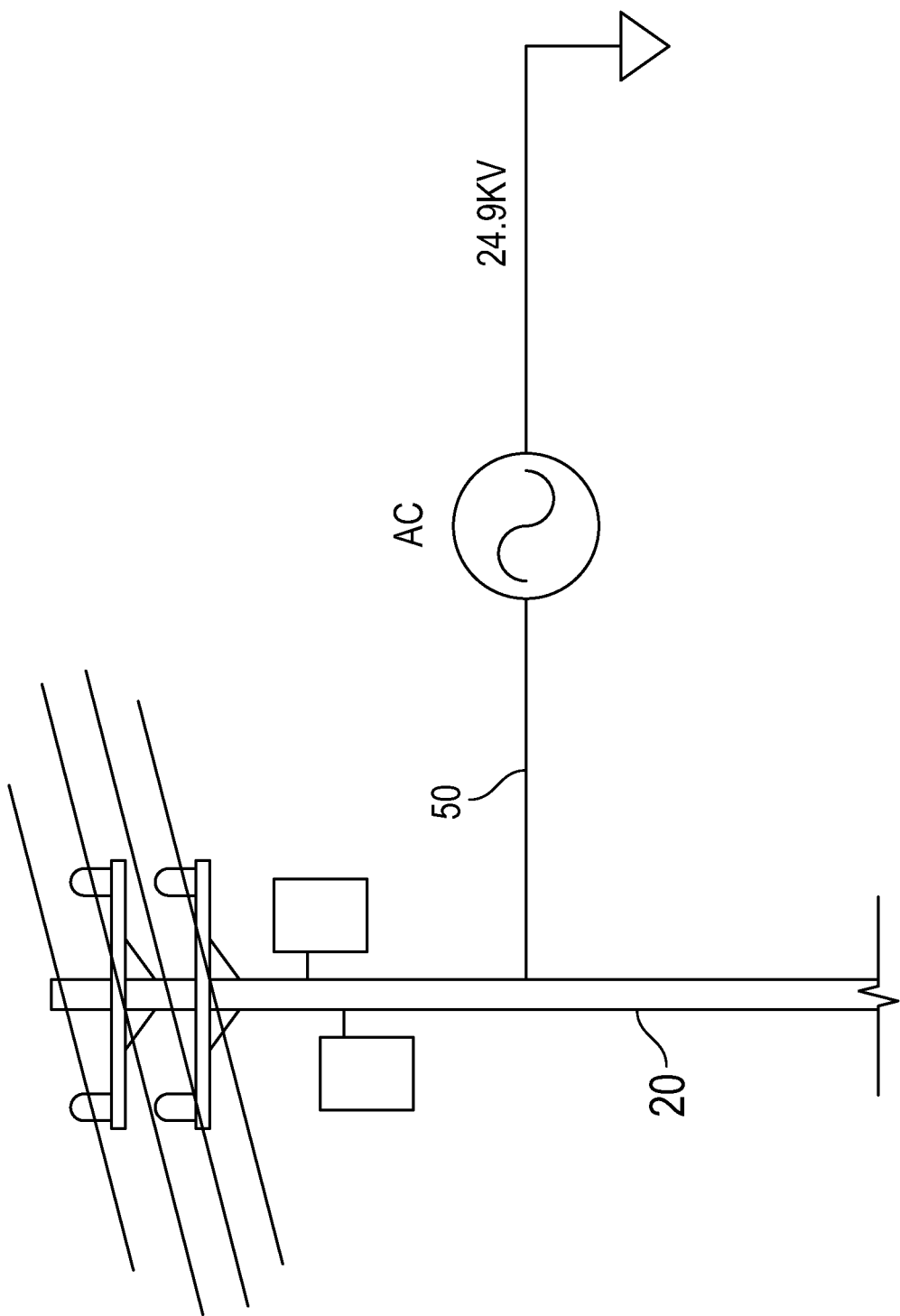
FIG. 2 is a block diagram depicting a distribution pole with predetermined electric grid specifications, in accordance with certain illustrative embodiments described herein.

With reference to the illustrative embodiment of FIG. 2, a utility electric grid 20 and its related structures and equipment (for example, and without limitation, a 24.9 KV distribution pole) can supply sufficient power to operate a fleet of electric motors 68 and fluid pumps 70 during standard operation without the equipment needing to draw from a variety of other power sources, either simultaneously or in sequential, priority or staggered order.

While the utility electric grid 20 shown in FIG. 2 is an above-ground utility grid, an underground utility grid can also be utilized and is within the scope of the presently disclosed subject matter.

In certain illustrative embodiments, each fracturing location may have a power distribution pole supplied by a utility service provider. The distribution pole can have, for example, a max height of 45 feet providing 24.9 KV service and can be connected directly to a mobile substation capable of providing 24.9 KV service. In certain embodiments, the distribution pole can be connected to the mobile substation via at least one conductor cabling of a plurality of conductor cabling. The at least one conductor cabling can be a single conductor or a multi conductor cabling. In certain embodiments, a breaker can be directly in line with an initial transformer 32a-32d capable of 24.9 KV and/or 13.8 KV for transformer protection.

In certain illustrative embodiments, each distribution pole can be equipped with a manually operated air connect/disconnect switch. This switch will typically be maintained by the service provider and all electrical connections will be handled by the service provider, although a user could maintain and handle the equipment under certain circumstances. Properly rated multi conductor cabling can be connected to the air disconnect by the service provider. The cable can be maintained and tested each pad move for integrity and safety purposes. A cable opposite of the air disconnect switch on the distribution pole can be equipped with a TJB connector with the mobile substation 30 being equipped with a TJB receptacle providing the connectivity at the mobile substation 30. This connection at the mobile substation 30 can be managed by personnel of the user.

Mobile Power Substations

Figure 3:
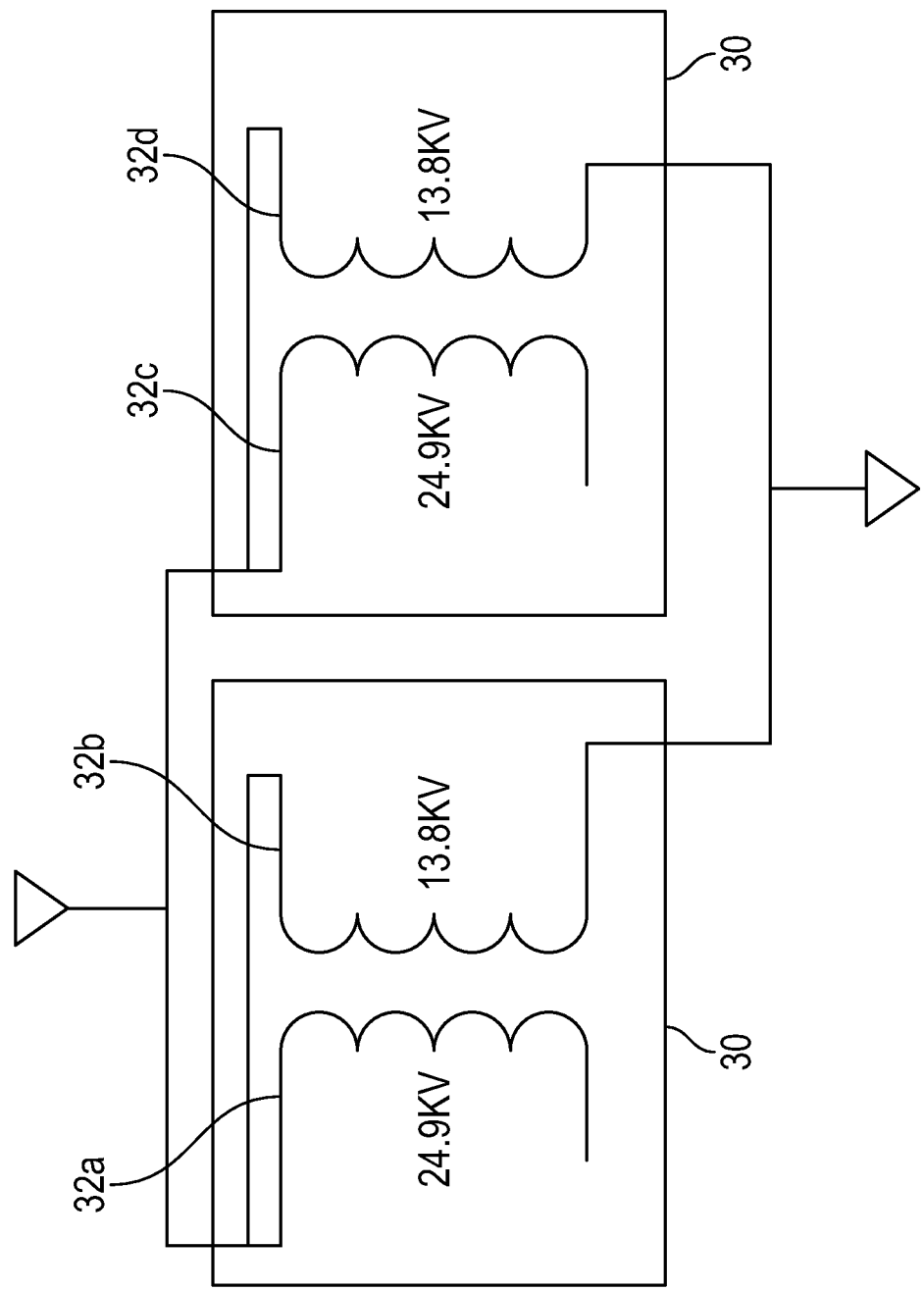
FIG. 3 is a block diagram depicting at least one electrical line associated with the mobile substation, in accordance with certain illustrative embodiments described herein.

With reference to the illustrative embodiments of FIG. 3, system 10 can utilize a plurality of mobile power substations 30.

In the illustrative embodiment shown in FIG. 3, two mobile power substations 30 are utilized. Each substation 30 can include an initial transformer 32a-32d that is enclosed within the trailer or sits on the trailer. For example, the initial transformer 32a-32d can be a 30 MVA oil filled transformer mounted on a 46' overall length trailer and/or an 8' 6" overall width trailer.

In certain illustrative embodiments, each 30 MVA mobile power substation 30 can be connected to the utility electric grid 20 via a pair of multi-conductor cables with safety interlocks in conjunction with the air disconnect on the distribution pole.

In various illustrative embodiments, the system 10 has the capability for sufficiently powering the fracturing equipment using either a single mobile power substation 30 operating independently, or a pair of mobile power substations 30 operating in parallel, or a plurality of mobile power substations 30 capable of operating together or independently (e.g., during equipment failure or planned maintenance).

In certain illustrative embodiments, the initial transformers 32a-32d in the pair of mobile power substations 30 operate in parallel using the utility electric grid 20 as a single power source, which provides certain specific advantages. In certain embodiments, these certain advantages can include allowing redundancy within the system should a mobile substation fail; flexibility to split the buss network; independently operate the fleet on two different buss networks; and operate a plurality of substations in parallel and/or independently.

As used herein, the term "parallel" with respect to operation of mobile power substations 30 includes a first transformer 32a and a second transformer 32b each housed in or disposed on a single mobile substation 30, or includes separate transformers 32n housed in or disposed on separate mobile substations 30, or a single mobile substation 30 hosting multiple pairs of transformers 32n. The various embodiments described herein encompass any of these scenario for "parallel" operation, and this written description shall be construed in accordance therewith.

In certain illustrative embodiments, as shown in FIG. 3, the first transformer 32a-32d has a first primary coil 32a (input coil) and a first secondary coil 32b (output coil), and the second transformer 32 has a second primary coil 32c (input coil) and a second secondary coil 32d (output coil).

In certain embodiments, a switch can be at the rear of the mobile power substation and can be connected to the 24.9 KV power supply. In response to a plurality of primary connections, a 24.9 KV breaker and a breaker enclosure can be connected to the switch at the rear of the mobile power substation. Anterior to the 24.9 KV breaker and the breaker enclosure, a relay enclosure can monitor the 24.9 KV breaker functionality.

In certain illustrative embodiments, each mobile power substation 30 can have 24.9 KV/13.8 KV, 30 MVA capability that can supply 13.8 KV to the switchgear trailer 40 with switchgears 40a. Each 30 MVA mobile power substation 30 can be utilized in conjunction with a distribution network within switchgear trailer 40 with switchgears 40a powering a plurality of VFDs managing the functionality of medium voltage motors and low voltage motors. The mobile substations 30 operating in parallel will be able to deliver up to 60 MW of available power to accomplish fracturing operations. System 10 will be capable of monitoring all power usage and with remote functionality of circuit breakers and switches.

In certain illustrative embodiments, each mobile power substation 30 can deliver the 13.8 KV voltage needed to operate electrical equipment for a fracturing operation effectively and efficiently. Each mobile power substation 30 can have capacity for a primary voltage of 24.9 KV equipped with a Delta primary winding. The secondary WYE winding can deliver the needed 13.8 KV system voltage to the switchgear trailer 40. By using the WYE winding on the secondary of the initial transformer 32a-32d of each mobile power substation 30, a high resistance grounding system can provide for integrity and safety of personnel.

In certain illustrative embodiments, the parallel operation for the pair of mobile power substations 30 means that neither substation is prioritized, and the load requirement is equally shared between the initial transformers 32a-32d in the two substations 30. There is no controller (automated or manual) that is distributing load between the initial transformers 32a-32d in an unequal manner, e.g., pulling 20 megawatts of power from one transformer 32a-32d while pulling 10 megawatts of power from the other transformer 32. Further, if (for example) a first transformer 32a-32d including the first primary coil 32a and the first secondary coil 32b in the first mobile substation 30 goes out of operation, system 10 will operate solely from a second transformer including the second primary coil 32c and the second secondary coil 32d in second mobile substation 30, without syncing up to any external power sources to power fracturing operations. The mobile substation can share the load between at least two mobile substations at equal percentages based on total amount of load. In certain embodiments, the mobile substation 30 can provide more load than the initial transformer 32a-32d. In another embodiment, the first mobile substation can be actively in use, and the second mobile substation can remain in an open position to tie the breaker.

The mobile substation 30, or pair of mobile substations 30, described herein has certain operating parameters that are distinguishable from, and advantageous over, a standard non-mobile, stationary substation/transformer unit. A standard substation/transformer unit can be built on-site to meet required power specs and the initial transformer 32a-32d can be sized and operated accordingly; however, the resulting structure would be stationary and could not be easily or economically moved from site to site. By comparison, the mobile power substations 30 described herein can have the initial transformers 32a-32d that are smaller in size, but still sized to operate system 10 and meet capacity for a variety for fracturing operations and can also be housed on one or more trailers such that they are portable and can be moved from site to site in an economical manner. Moreover, the mobile power substations 30 described herein can be temporarily secured onsite so that they are stationary during operation, while still maintaining the capability to be moved from site to site for future uses in an economical manner.

In certain illustrative embodiments, where a single mobile substation 30 is operating independently, and not in parallel with another substation 30, a user can curb the load on system 10 (e.g., reduce capacity to less than 60 MW on the fracturing operation). The operation may not be able to run at a normal rate but can still make a necessary day rate, operating at or near, e.g., 26 MW. Adjustments can be made to meet the required supply rates.

For example, in certain illustrative embodiments, a method is provided for adjusting the operating parameters of a fracturing operation wherein two mobile substations are operated in parallel initially to meet fracturing specifications, and then one of the mobile substations is removed from operations, resulting in only a single mobile substation in operation, and one or more operational parameters are adjusted such that fracturing specifications are still met while utilizing only the single mobile substation.

Figure 4:
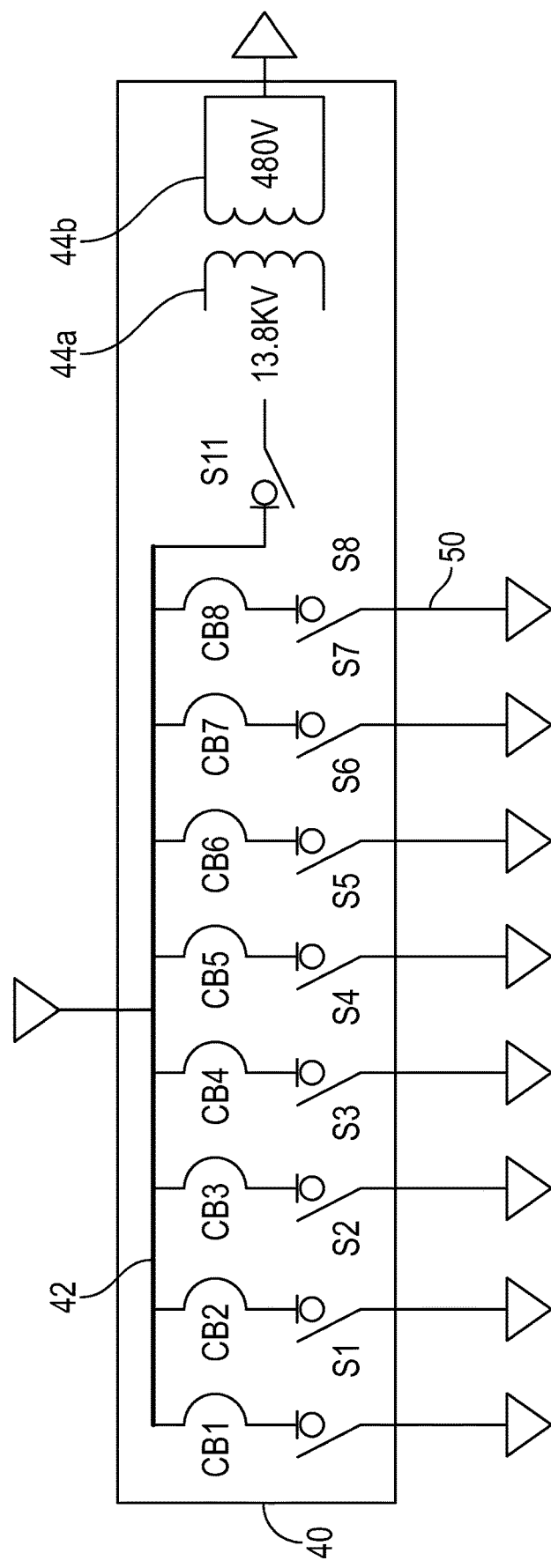
FIG. 4 is a block diagram depicting at least one electrical line associated with the switchgear, in accordance with certain illustrative embodiments described herein.
Figure 5:
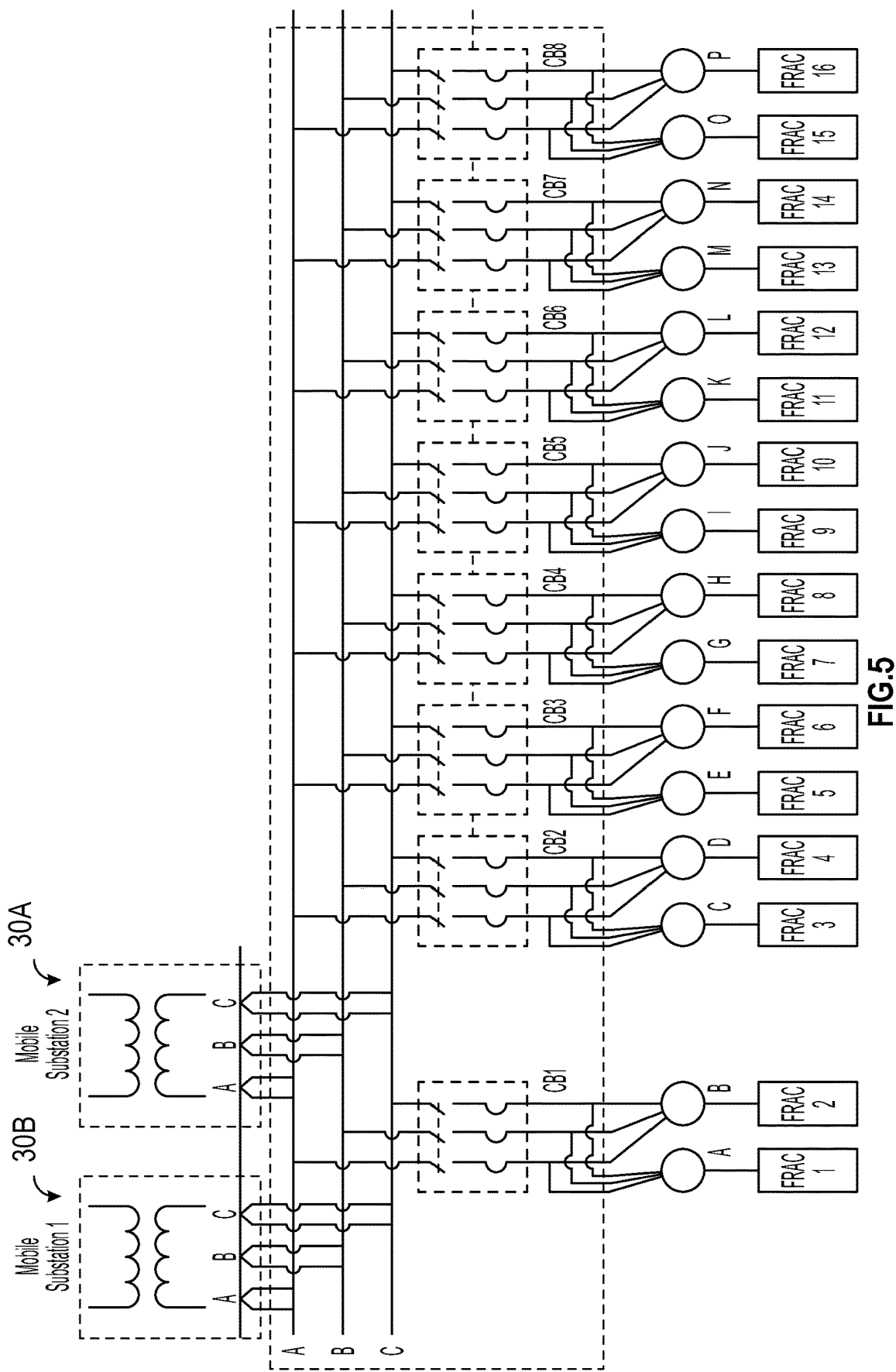
FIG. 5 is a block diagram depicting an electrical line running through the mobile substation to the switchgear and a plurality of downline frac pumps, in accordance with certain illustrative embodiments described herein.

Table 1, shown below, provides examples of various operational parameters that can be adjusted in accordance with the method described above, to meet fracturing specifications.

ment of FIG. 4 and FIG. 5, there are eight (8) CBs present, numbered CB1-CB8. In certain embodiments, the CBs can refer to a depiction of the switchgear 40a. In other embodiments, the CBs can refer to an exact representation of the plurality of input bays and/or the plurality of output bays.

Figure 6A:
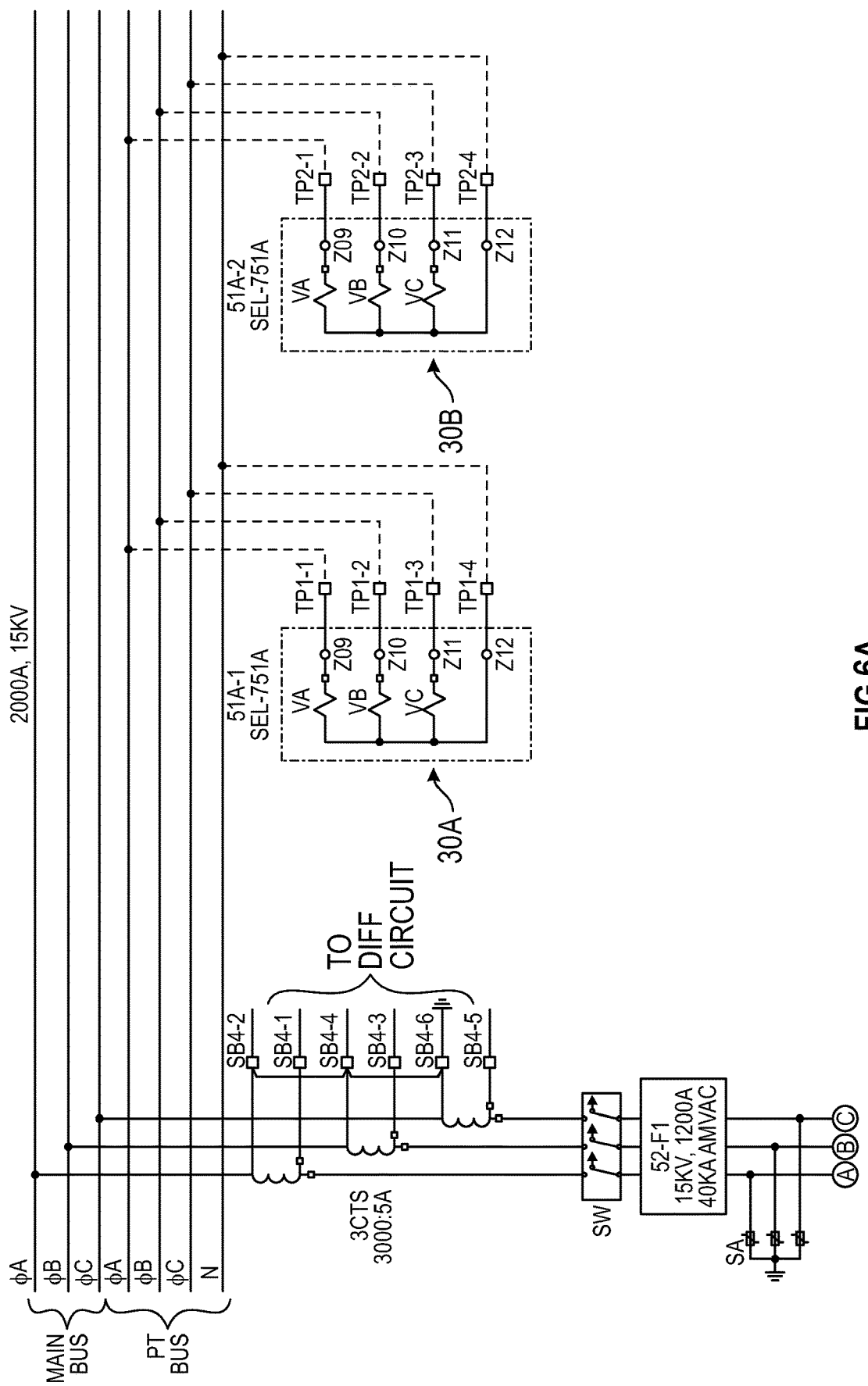
FIG. 6A is an upstream cross-sectional view of an electrical line associated with a switchgear buss network, in accordance with certain illustrative embodiments described herein.
Figure 6B:
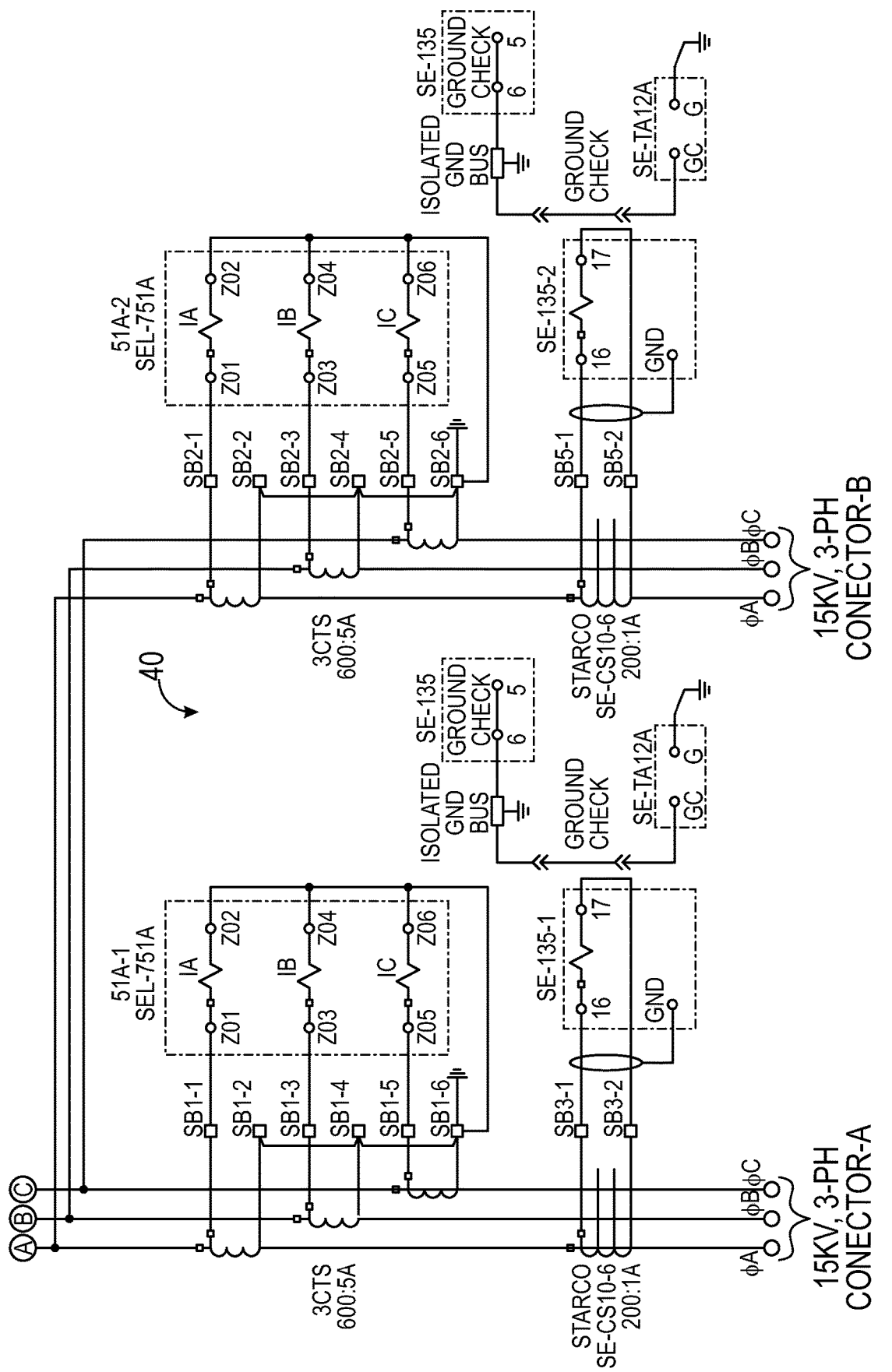
FIG. 6B is a downstream cross-sectional view of an electrical line associated with a switchgear buss network, in accordance with certain illustrative embodiments described herein.

FIG. 6A and FIG. 6B show an upstream and downstream, respectively, one line drawing of switchgear and monitoring circuits for switchgear trailer 40 associated with each output bay. The connection A/B utilizes the 13.8 KV surface cable that houses ground check, communication via fiber, and main conductors. In certain embodiments, the switchgear trailer 40 may be connected to the mobile substation 30A and the mobile substation 30B via an open air relay cable.

Figure 7:
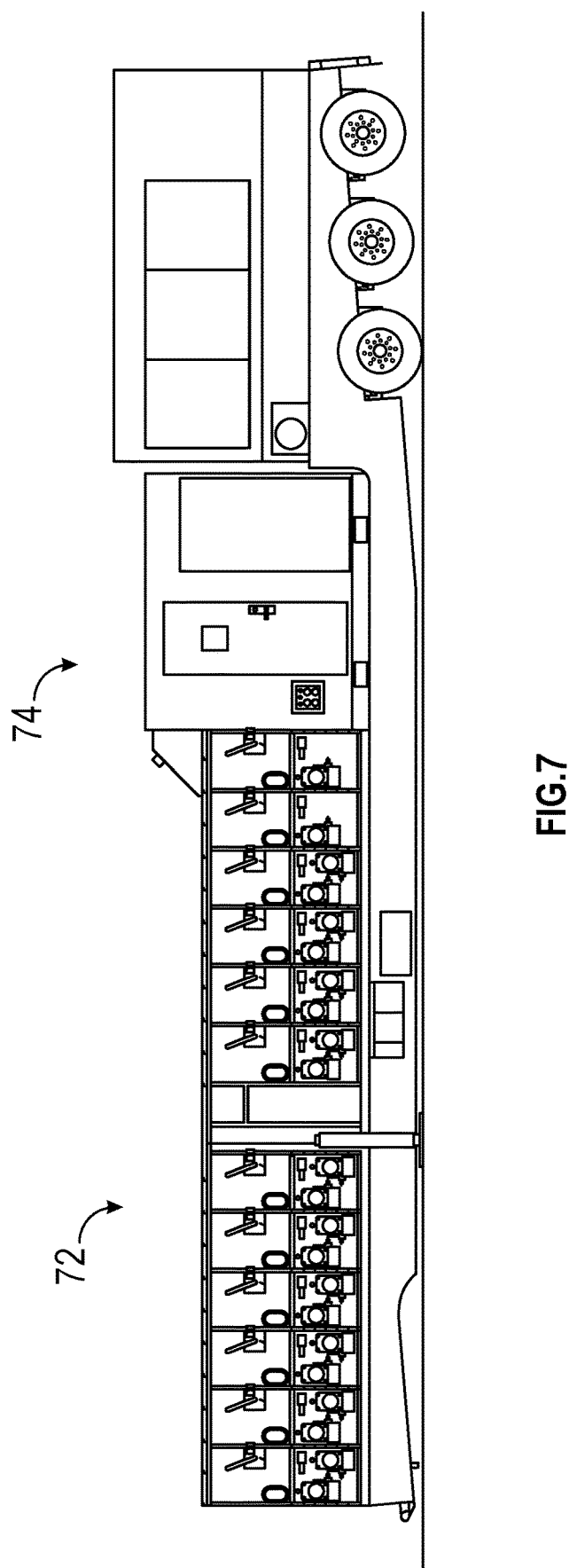
FIG. 7 is a cross-sectional front view of the switchgear, in accordance with certain illustrative embodiments described herein.

FIG. 7 shows the output/input side of switchgear trailer 40, including the output bays and the orientation of the

TABLE 1

Adjustment of Operational Parameters to Achieve Fracturing Specifications When Switching Operations from Two Mobile Substations in Parallel to a Single Mobile Substation

| +/- | Hold Pressure | Transformer Size | VFD Capability | Load Demand | Grid Supply | Number of Pump Trailers in Operation | Barrels per Minute |
|---|---|---|---|---|---|---|---|
| Parallel Operation | Maximum Capacity | 60 MVA | 100% | 100% | 60 MVA | 18 Frac Pumps 2 Blenders | 360 |
| Single Operation | TBD | 30 MVA | 100% | 100% | 30 MVA | 8 Frac Pumps 2 Blenders | 120 |

Switchgear Trailer

With reference to the illustrative embodiments of FIG. 4-FIG. 6, system 10 can include a switchgear trailer 40. Switchgear trailer 40 allows for automated functioning of a switchgear with the flexibility of a plurality of distributions operatively associated with the switchgear and comprising medium voltage circuit breakers ("CBs") to provide 13.8 KV to downstream equipment.

In certain illustrative embodiments, the switchgear on switchgear trailer 40 comprises a single bus network with multiple distributions or outputs off of the single bus. Switchgear trailer 40 can have a single multiconductor cable per output bay equipped with communication potential in the same. Switchgear trailer 40 can be equipped with dual output bays (e.g., quantity 10) as well as input or "APU" bays (e.g., quantity 2) for additional 13.8 KV generating sources. Switchgear trailer 40 can be locally controlled or remotely controlled and can have a multitude of protections within the buss network and externally of switchgear trailer 40 to protect users and equipment.

In certain illustrative embodiments, switchgear trailer 40 can be equipped with a 480V distribution center that is powered by an onboard transformer capable of 13.8 KV/480 V, 1 MVA, powering the normal 480 V distribution buss when 13.8 KV is present on the main buss. For situations when 13.8 KV voltage is unexpectedly removed from the buss network from any of the 13.8 KV sources, switchgear trailer 40 can be equipped with a Cat C15 Engine/480 V generator that will start automatically applying 480 V power to the 480 V emergency distribution. This can be an automatic function with auto transfer switches to allow for a seamless transition between normal buss operation and emergency buss operation.

FIG. 4 and FIG. 5 show exploded views of switchgear trailer 40 with a plurality of distributions each having a "CB" or circuit breaker positioned thereon. In the embodidecarbonization receptacles (e.g., from Cavotec®). In certain embodiments, the switchgear trailer may display at least one turbine and/or mobile substation connection point 72 and a 480 V distribution MCC 74.

Figure 8:
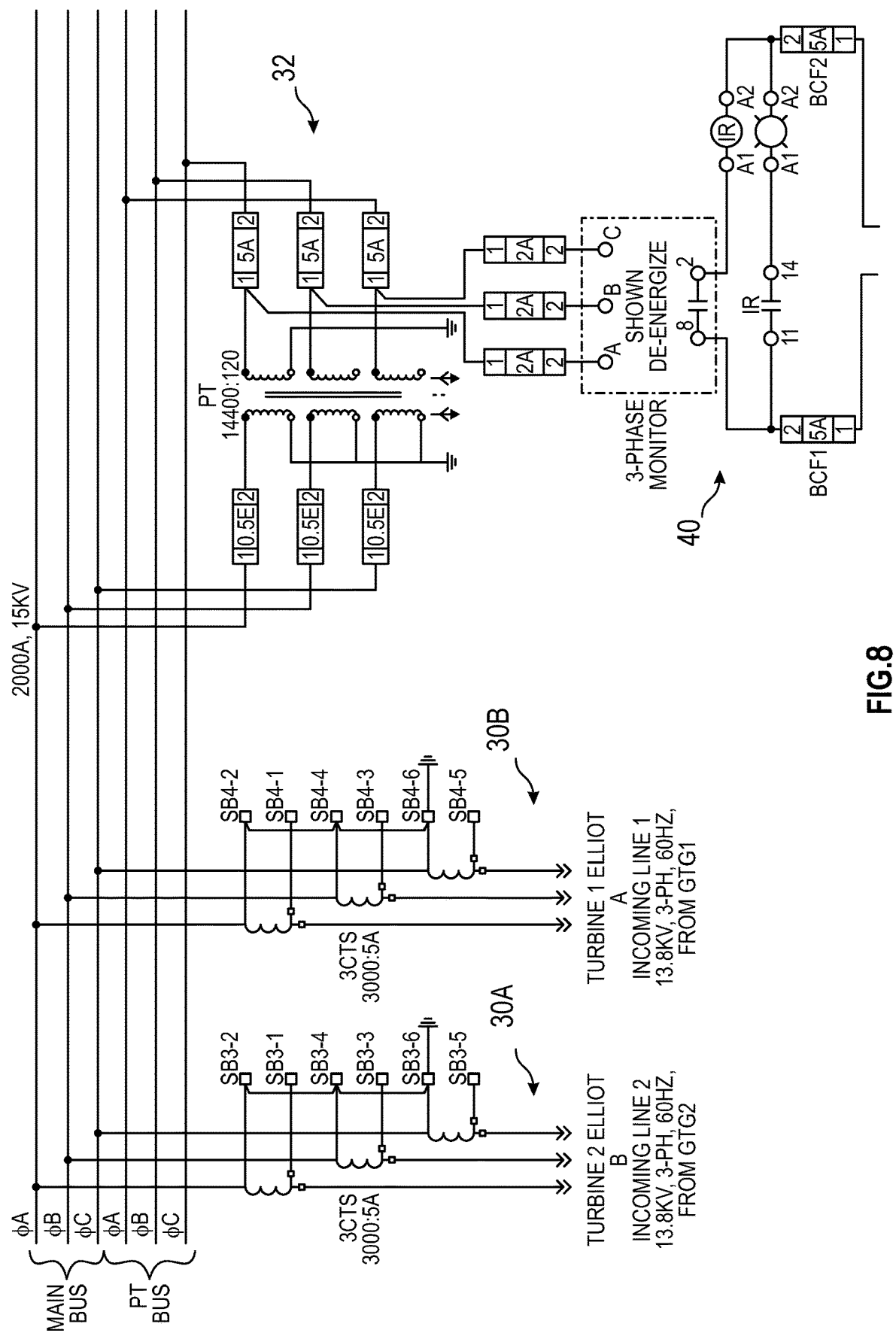
FIG. 8 is a block diagram of at least one electrical line of the buss network input electrical supply, in accordance with certain illustrative embodiments described herein.

FIG. 8 shows a one line drawing of the 13.8 KV input connections to the main buss network of switchgear trailer 40. These connections can be used to connect the turbine or the mobile substation 30A and the mobile substation 30B via the initial transformer 32a-32d.

In certain illustrative embodiments, switchgear trailer 40 can utilize a single switchgear to power a single piece of equipment or various equipment, or multiple switchgears to power various equipment, depending on the capacity of the switchgears and their capability to power the motors, pumps, blenders and other equipment on pump trailer 60 or otherwise in the system 10. Also, multiple switchgear trailers 40 could be utilized, as needed.

Switchgear trailer 40 is designed with the flexibility of many various 15 KV inputs, allowing for ease of connection to the grid electric power 20, and sized to maintain available electrical supply from the grid electric power 20 in a variety of applications and specifications. For example, the flexibility of the switchgear trailer can run a common buss configuration and/or a split buss configuration. In certain embodiments, each configuration of the buss can be operated with a plurality of inputs from grid power, where each input is capable of 15 KV process. In other embodiments, each configuration of the buss can be operated with the plurality of inputs from turbine power.

Pump Trailer

Figure 9:
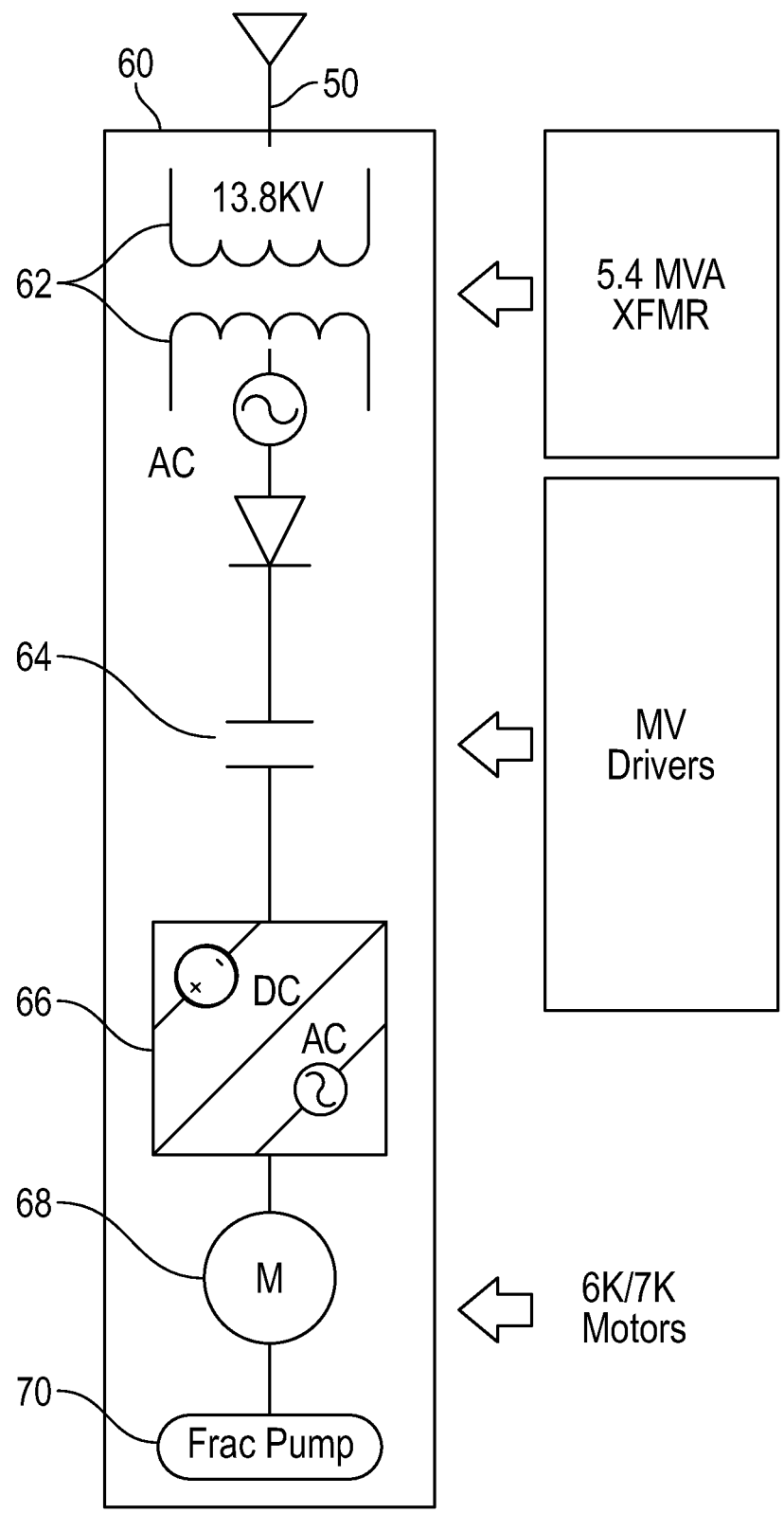
FIG. 9 is a block diagram of a plurality of main electrical components of a frac pump, in accordance with certain illustrative embodiments described herein.
Figure 12:
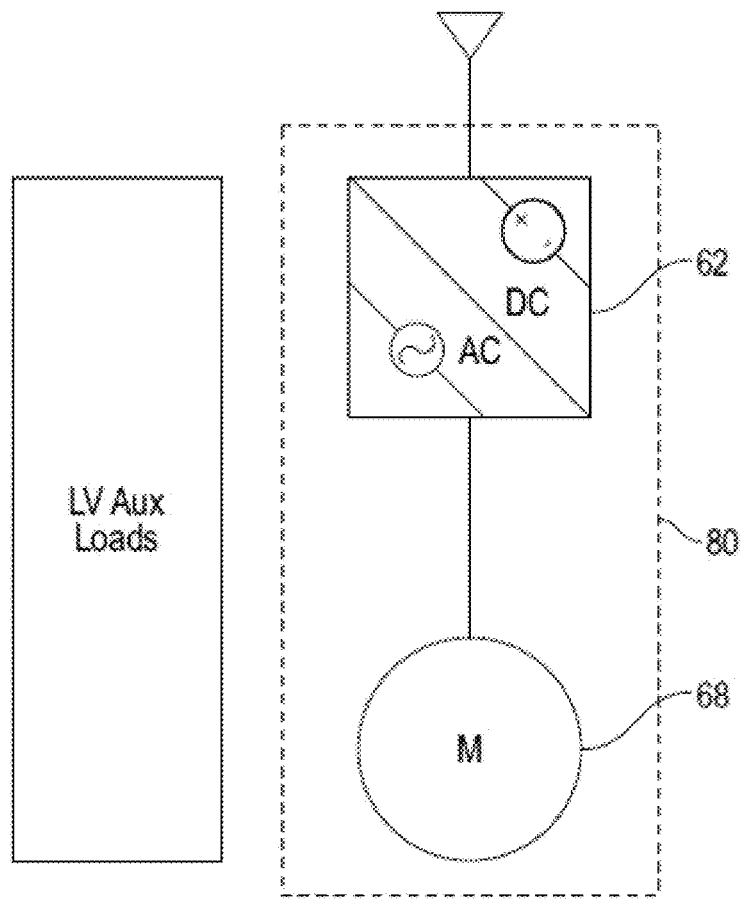
FIG. 12 is a block diagram of a variable frequency drive with a low voltage application, in accordance with certain illustrative embodiments described herein.

With reference to the illustrative embodiment of FIG. 9 and FIG. 12, a pump trailer 60 for system 10 is shown.

Pump trailer 60 can include a trailer transformer 62, at least one capacitor 64, a Variable Frequency Drive 66 (VFD), and an electric motor 68 coupled to one or more electric pumps 70, in certain illustrative embodiments. A suitable pump is a centripetal style pump, for example, the centripetal pump sold by GD Energy Products.

Electric motor 68 is operatively associated with turbine generator 30, in certain embodiments. Typically, each pump trailer 60 will include a trailer transformer 62 to step down the voltage of the power from switchgear 40 to a voltage appropriate for electric motor 68. The trailer transformer 62 can be provided as an independent unit, or can be permanently fixed to the pump trailer 60, in various embodiments.

If permanently fixed, the trailer transformer 62 can be scalable to allow the addition or subtraction of motors 68, pumps 70 or other components to accommodate any operational requirements. Each pump 70 and electric motor 68 is modular in nature so as to simplify removal and replacement from pump trailer 60 for maintenance purposes.

Figure 10:
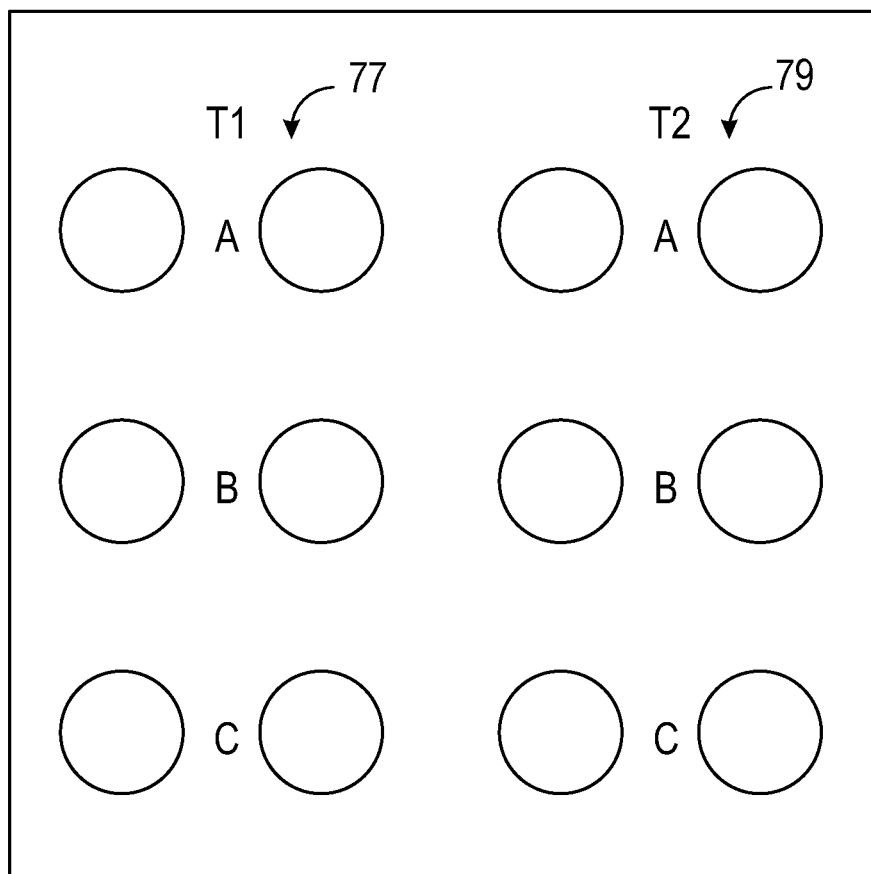
FIG. 10 is a cross-sectional view of a plurality of input bays associated with a plurality of turbines, in accordance with certain illustrative embodiments described herein.

FIG. 10. depicts cross-sectional view of a plurality of input bays associated with a plurality of turbines (not shown), in accordance with certain illustrative embodiments described herein. In certain embodiments, a first turbine port 77 can maintain a plurality of ports and/or input bays to receive power and/or provide power to the switchgear trailer 40. In certain embodiments, a second turbine port 79 can maintain a similar plurality of ports and/or input bays to receive power and/or provide power to the switchgear trailer 40.

Electric Motor

With reference to the illustrative embodiments herein, electric motor 68 receives electric power from utility electric grid 20, and is coupled directly to pump 70. In order to ensure suitability for use in fracturing, electric motor 68 should be capable of operation up to 800 rpms with a torque of up to 25 ft/lbs, in certain illustrative embodiments. A motor suitable for this purpose is sold under the trademark WEG® and is available from WEG Electric Corp. or its affiliates.

Connector Cable

Figure 11:
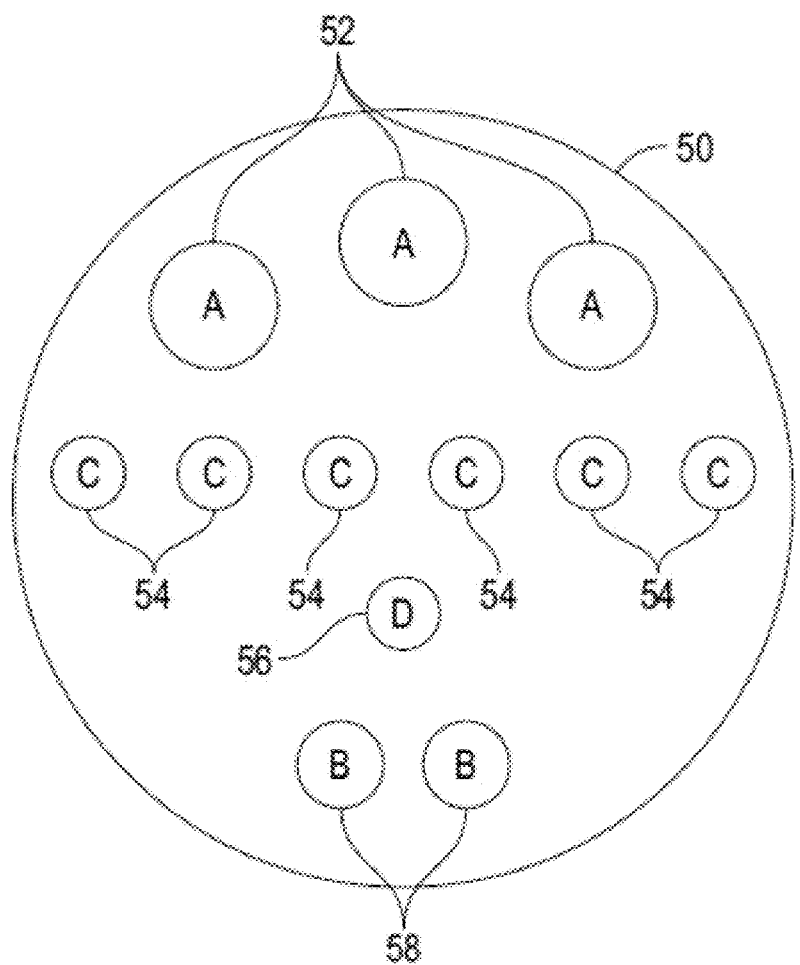
FIG. 11 is a block diagram of a communication cable with fiber optics and protection elements, in accordance with certain illustrative embodiments described herein.

With reference to the illustrative embodiments of FIG. 11, a 13.8 KV surface cabling 50 can be utilized to connect switchgear trailer 40 to pump trailer 60. Surface cabling 50 can comprise a single cable line that houses a variety of functional cables such as power conductors, communication fiber optics cables, grounding, and ground check (to trip switchgear automatically if unplugged), with electrical and mechanical interlocks.

For example, the surface cabling 50 in FIG. 11 houses, without limitation, three main power conductors, six communication fibers, grounding and bonding cable, and two ground check cables. The ground check cable has sensors located thereon such that if it loses continuity at any time, it opens up the main switchgear breaker. This is a protection circuit in the event that, for example, an employee or someone removes the surface cabling 50 without deenergizing the cable, it will automatically deenergize itself. The sensors are located outside on the switchgear and the rear of the pump trailers 60, and are configured to sense the continuity in the cable for ground check.

In another example, the surface cabling 50 in FIG. 11 houses, without limitation, one or more of a main conductor 52, a ground check circuit conductor 58 (electrical interlock), grounding/bonding cable 56, fiber 54 for communication to pump trailer 60, camera communications, and main power cabling 52. Surface cabling 50 can be used to operably connect the switchgear distributions from switchgear trailer 40 to a corresponding pump trailer 60 or blender. Either a single line of surface cabling 50, or multiple lines of surface cabling 50, may be utilized depending on capacity needs.

In certain illustrative embodiments, a ground check circuit conductor 58 (electrical interlock) is utilized. In certain embodiments, the electrical interlock can ensure that the cable is not energized when not connected. In other embodiments, the electrical interlock can electrically de-energize the circuit and disconnect the cable in response to the cable becoming energized to protect individuals and equipment.

In certain illustrative embodiments, surface cabling 50 is an open-air relay cable. An open-air relay cable is different from a superconductor cable because a superconductor cable is housed in fluid. The current capacity of a superconducting cable exceeds the insulation capacity or specifications of the cable, so a supercooled liquid is used to lower the rating of the cable by cooling or lowering the operating temperature of the insulation and help raise the capability of the outer insulation of the cable.

By comparison, when surface cabling 50 is an open-air relay cable, the medium voltage can be maintained from the switchgear trailer 40 to the pump trailer 60, and then the voltage on the secondary side of the 13.8 KV, 2100, 40-volt trailer transformer 62 on pump trailer 60 can be reduced down. This is the location where the current is increased, on pump trailer 60 instead of before reaching pump trailer 60 as would occur with superconducting cable. The surface cabling 50 that is an open-air relay cable is manageable in the enclosure to the motor on pump trailer 60 to handle the high current rate to get the current or voltage and current from switchgear trailer 40 to the actual working motor on pump trailer 60. The current increase occurs in an efficient manner within the electrical components of the pump trailer 60, with the trailer transformer 62 and the VFD 66 all in one package, in very short runs of cabling at that moment.

Auxiliary Power

With reference to the illustrative embodiment of FIG. 12, an auxiliary trailer 80 is provided. Auxiliary trailer 80 operably connects to an "MCC" or motor control center on switchgear trailer 40. The MCC includes a 480 volt side to power auxiliary loads and a 13.8 side as well, encompassed in one unit on switchgear trailer 40. The auxiliary loads can be used to power, for example, sand, turbine, chemicals, data vans, air compressors, lube oils, cooling fans, and other auxiliary units other than the motors and pumps which are primary components of pump trailer 60.

Safety Connect/Disconnect From Grid Power

In certain illustrative embodiments, methods are provided for connecting/disconnecting system 10 from grid electric power 20. A circumstance when disconnect would be needed would be, for example, a safety concern such as if there is a major fault, major failure or a need to service the substations or for preventative maintenance on the substations or in order to reboot one or more components of system 10.

Figure 13A:
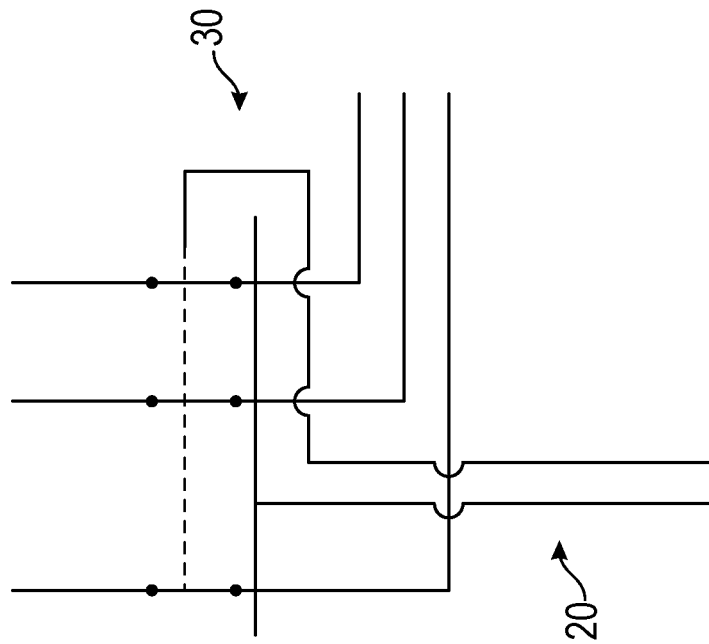
FIG. 13A is a block diagram of a pole top air disconnect switch in an off position, in accordance with certain illustrative embodiments described herein.
Figure 13B:
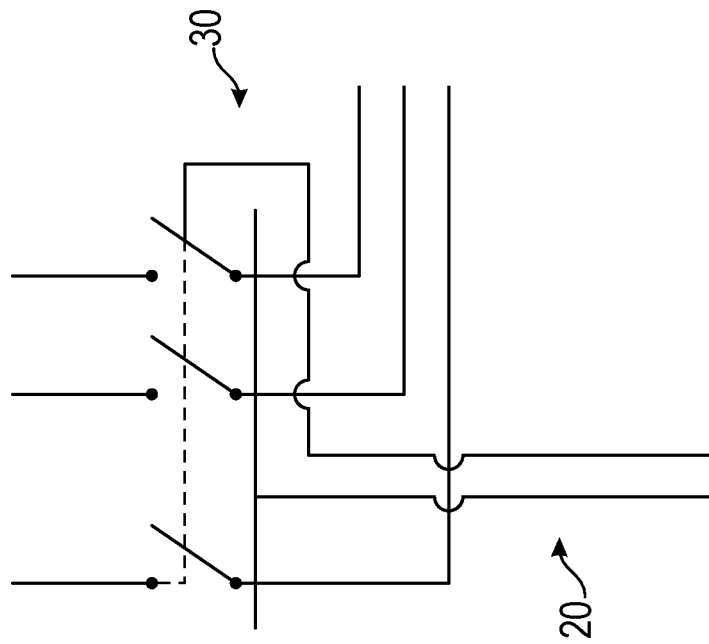
FIG. 13B is a block diagram of a pole top air disconnect switch in an on position, in accordance with certain illustrative embodiments described herein.

With reference to the illustrative embodiment of FIG. 13*a* and FIG. 13*b*, a power pole of grid electric power 20 has electric power coming in, and is operably connected to mobile substations 30. A connect/disconnect switch is located on top of the power pole. Connect/disconnect switch can be moved between an open position (FIG. 13*a*) and a closed position (FIG. 13*b*). The power line has a high line of, for example, 24.9 kV and a 45-megawatt supply. Power will only be delivered to switchgear 40 when the disconnect switch is in the closed position. The disconnect switch can be opened or closed by an actuator on the side of the power pole.

In certain illustrative embodiments, a method of connecting to electric grid power can include the following steps: (i) the power company will position a delivery cable between the electric grid power 20 and the mobile substations 30; (ii)

the power company will visually inspect to verify that the actuator is in the open position with an air break; (iii) upon verification of step (ii), power company will connect cable to mobile substations 30; (iv) power company will access a pair of key blocks A and B on the actuator that mechanically prevent the actuator from closing, whereby key block A is for a first mobile substation 30a and key block B is for a second mobile substation 30b, and turn the keys in key block A and key block B from an "open" to a "closed" position; and (v) upon step (iv) occurring, a key C is made available for accessing the actuator and converting the actuator from an open to a closed position.

The first mobile substation 30a cable is plugged in, a first key is removed and installed in a first key socket. A second mobile substation 30b is plugged in, key block B is removed, plugged into the actuator key block B socket. In response to key block A and key block B being turned, key block C may be released. The moment that the key block C is released and inserted into the actuator mechanical lock; the actuator is released. At that time, the air disconnect switch may be automatically closed. In certain embodiments, the air disconnect switch may be closed by at least one technician. At the moment that the air disconnect switch is closed, the technician may verify that all three key sockets (i.e., key socket A, key socket B, and key socket C) are securely in place on the top of the pole that goes into the first mobile substation 30a and the second mobile substation 30b and verifies that the trailer transformer 62 has 24.9 KV. Once the trailer transformer 62 is verified, the technician may close at least one breaker, preferably a main breaker associated with the first mobile substation 30a and the second mobile substation 30b, to energize the trailer transformer 62. At that time, the technician confirms that there is 13.8 KV on the secondary side. If so, the technician closes and energizes the switchgear trailer 40 at that time.

In certain illustrative embodiments, a more streamlined method of connecting to electric grid power can include the steps of: (i) verifying that the actuator is open; (ii) plugging the cables in; (iii) once the cables are plugged in, closing the disconnect without having any of a plurality of interlocks requiring manual manipulation; (iv) verifying the voltages; and (v) closing the breakers.

Figure 14:
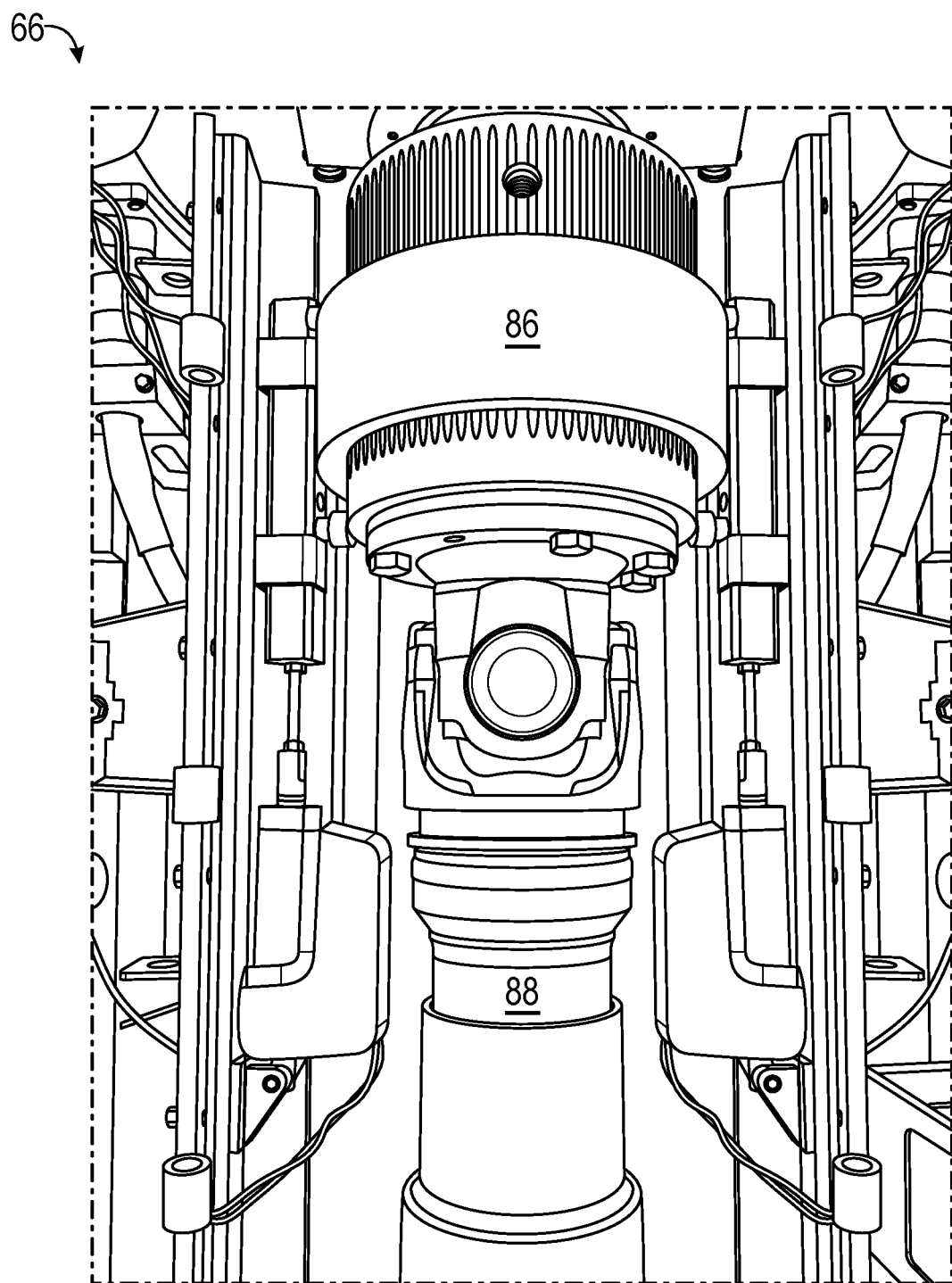
FIG. 14 is a top view of a variable frequency drive with a redesigned coupling system and at least one electrical actuator, in accordance with certain illustrative embodiments described herein.

In FIG. 14, a top view of the VFD 66 is depicted, detailing at least one coupling system 86 and at least one actuator 88. In certain embodiments, the VFD 66 may utilize a redesigned coupling system 86 to operate at least two actuators 88. In certain embodiments, the at least two actuators 88 may be electrical actuators capable of maintaining at least 24 VDC in power.

Figure 15:
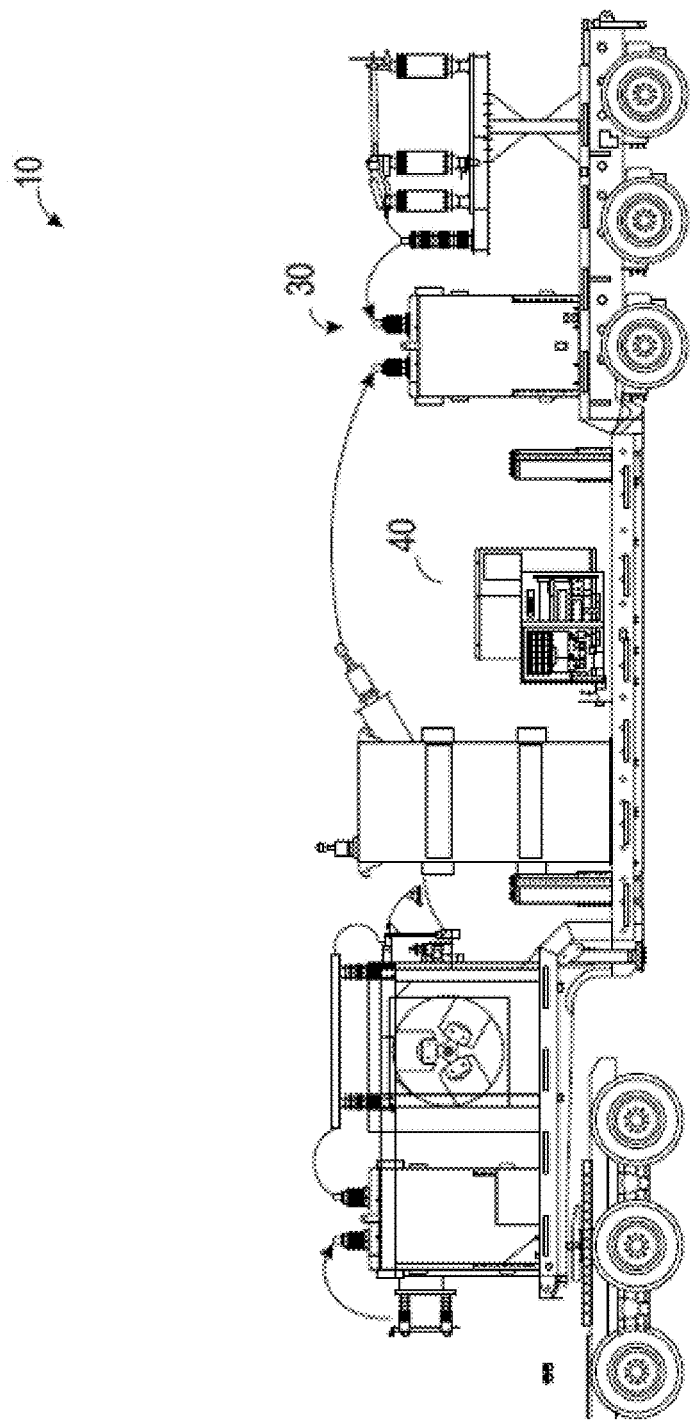
FIG. 15 is a cross-sectional view of an exemplary mobile substation, in accordance with certain illustrative embodiments described herein.

In the alternative embodiment shown in FIG. 15, cross-sectional view of an exemplary mobile substation, where a switch can be at the rear of the mobile power substation and can be connected to the 24.9 KV power supply. In response to a plurality of primary connections, a 24.9 KV breaker and a breaker enclosure can be connected to the switch at the rear of the mobile power substation. Anterior to the 24.9 KV breaker and the breaker enclosure, a relay enclosure can monitor the 24.9 KV breaker functionality.

In certain illustrative embodiments, each mobile power substation 30 can have 24.9 KV/13.8 KV, 30 MVA capability that can supply 13.8 KV to the switchgear trailer 40. Each 30 MVA mobile power substation 30 can be utilized in conjunction with a distribution network within switchgear trailer 40 powering a plurality of VFDs managing the functionality of medium voltage motors and low voltage motors. The mobile substations 30 operating in parallel will be able to deliver up to 60 MW of available power to accomplish fracturing operations. System 10 will be capable of monitoring all power usage and with remote functionality of circuit breakers and switches.

In certain illustrative embodiments, each mobile power substation 30 can deliver the 13.8 KV voltage needed to operate electrical equipment for a fracturing operation effectively and efficiently. Each mobile power substation 30 can have capacity for a primary voltage of 24.9 KV equipped with a Delta primary winding. The secondary WYE winding can deliver the needed 13.8 KV system voltage to the switchgear trailer 40. By using the WYE winding on the secondary of the transformer of each mobile power substation 30, a high resistance grounding system can provide for integrity and safety of personnel.

In certain illustrative embodiments, the parallel operation for the pair of mobile power substations 30 means that neither substation is prioritized, and the load requirement is equally shared between the transformers in the two substations 30. There is no controller (automated or manual) that is distributing load between the transformers in an unequal manner, e.g., pulling 20 megawatts of power from one transformer while pulling 10 megawatts of power from the other transformer. Further, if (for example) a transformer 32a/32b in the first mobile substation 30 goes out of operation, system 10 will operate solely from the other transformer 32c/32d in second mobile substation 30, without syncing up to any external power sources to power fracturing operations. The mobile substation can share the load between at least two mobile substations at equal percentages based on total amount of load. In certain embodiments, the mobile substation can provide more load than a transformer. In another embodiment, the first mobile substation can be actively in use, and the second mobile substation can remain in an open position to tie the breaker.

Figure 16:
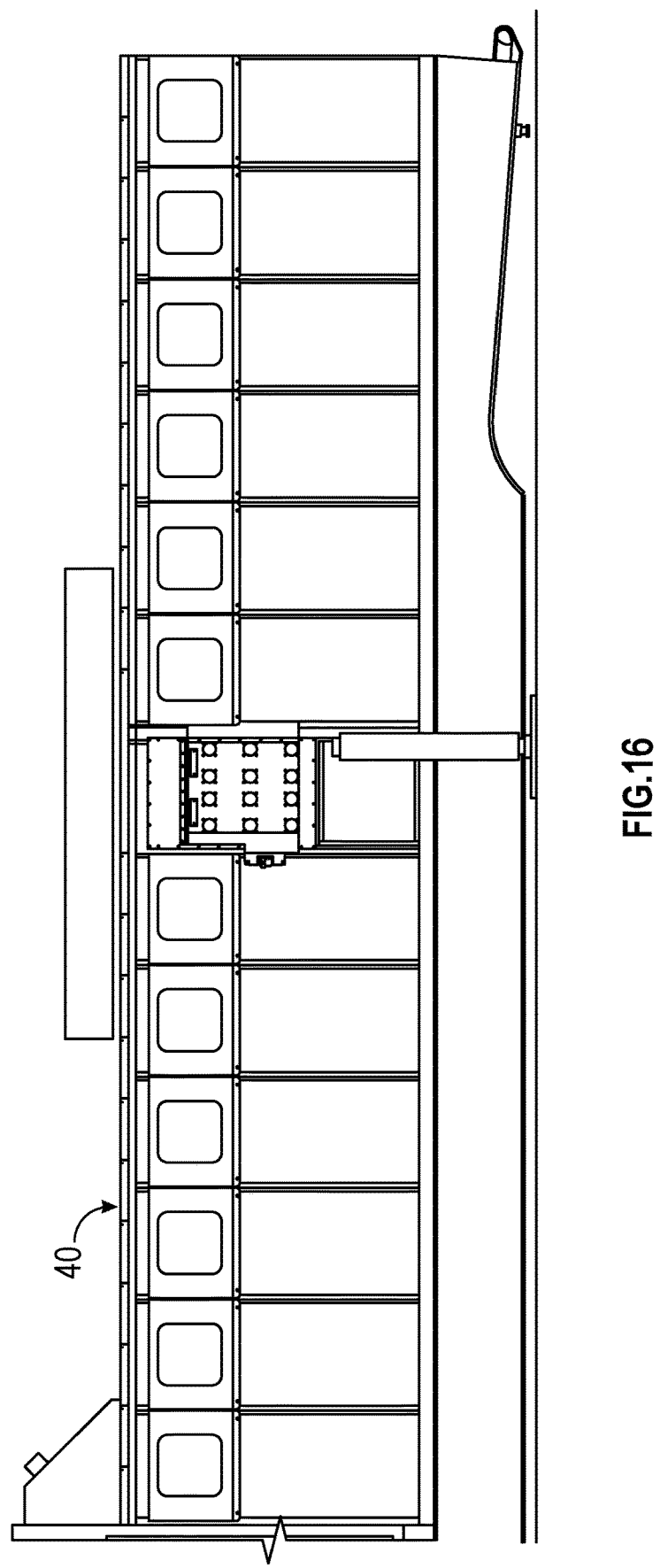
FIG. 16 is a cross-sectional rear view of the switchgear, in accordance with certain illustrative embodiments described herein.
Figure 17:
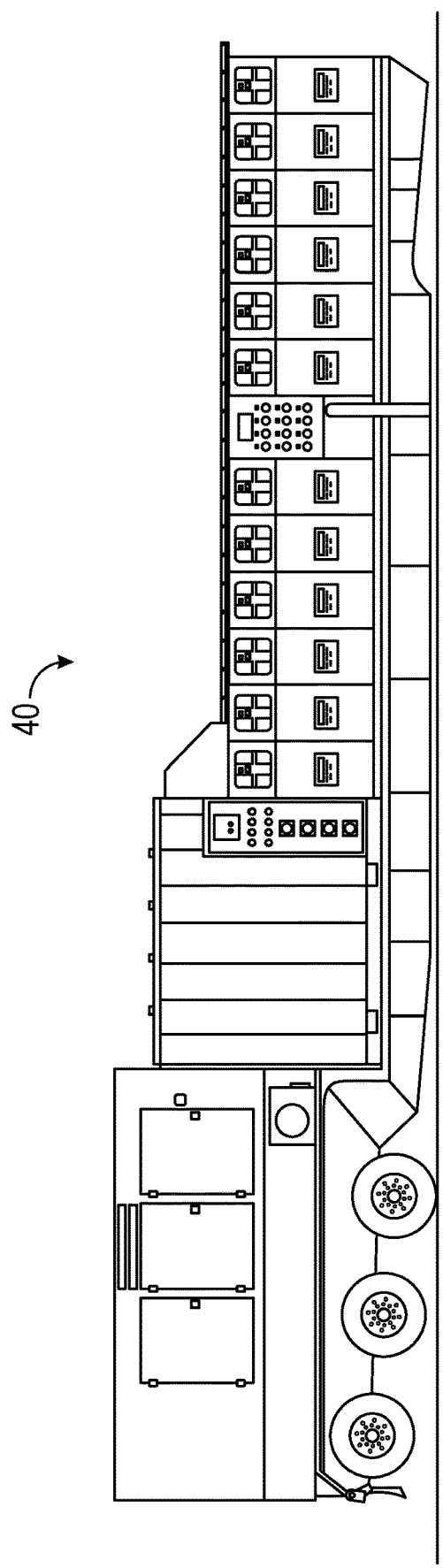
FIG. 17 is a side rear view of the switchgear, in accordance with certain illustrative embodiments described herein.

FIG. 16 and FIG. 17 shows the rear side, or turbine input bushings (e.g., Elliott® bushings) and output bay controls side, of switchgear trailer 40, including where the turbine is connected to the main buss via the 15 KV input bushings. In each bay, there are protection relays and fault monitoring of the switchgear equipment.

Figure 19:
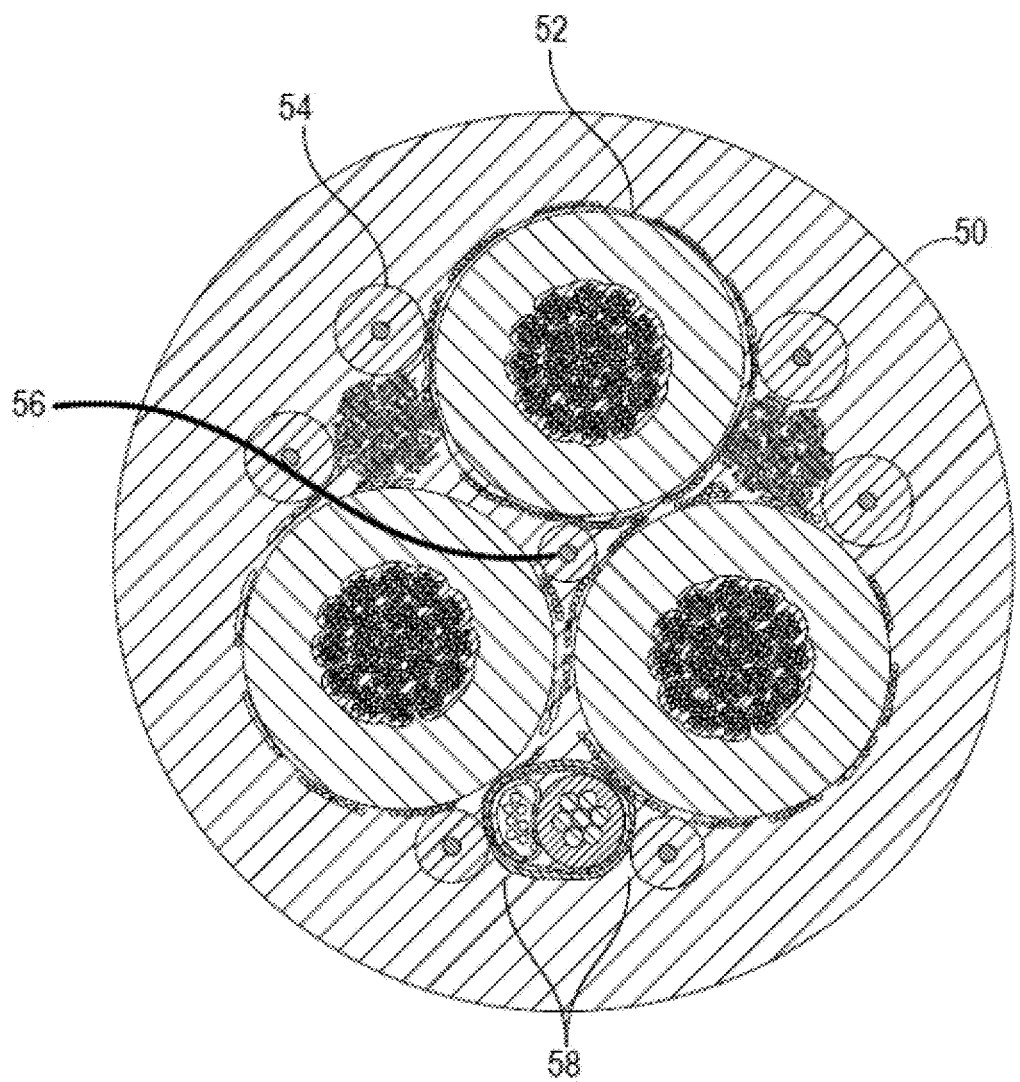
FIG. 19 is a cross-sectional view of the protection elements and fiber optics within the communication cable, in accordance with certain illustrative embodiments described herein.

In the alternative embodiment shown in FIG. 18 and FIG. 19, the surface cabling 50 houses, without limitation, one or more of the main conductors 52, a ground check circuit conductor 58 (electrical interlock), grounding/bonding cable 56, fiber 54 for communication to pump trailer 60, camera communications, and main power cabling 52. Surface cabling 50 can be used to operably connect the switchgear distributions from switchgear trailer 40 to a corresponding pump trailer 60 or blender. Either a single line of surface cabling 50, or multiple lines of surface cabling 50, may be utilized depending on capacity needs.

In certain illustrative embodiments, a ground check circuit conductor 58 (electrical interlock) is utilized. In certain embodiments, the electrical interlock can ensure that the cable is not energized when not connected. In other embodiments, the electrical interlock can electrically de-energize the circuit and disconnect the cable in response to the cable becoming energized to protect individuals and equipment.

In certain illustrative embodiments, surface cabling 50 is an open-air relay cable. An open-air relay cable is different from a superconductor cable because a superconductor cable is housed in fluid. The current capacity of a superconducting cable exceeds the insulation capacity or specifications of the cable, so a supercooled liquid is used to lower the rating of the cable by cooling or lowering the operating temperature of the insulation and help raise the capability of the outer insulation of the cable.

By comparison, when surface cabling 50 is an open-air relay cable, the medium voltage can be maintained from the switchgear trailer 40 to the pump trailer 60, and then the voltage on the secondary side of the 13.8 KV, 2100, 40-volt trailer transformer 62 on pump trailer 60 can be reduced down. This is the location where the current is increased, on pump trailer 60 instead of before reaching pump trailer 60 as would occur with superconducting cable. The surface cabling 50 that is an open-air relay cable is manageable in the enclosure to the motor on pump trailer 60 to handle the high current rate to get the current or voltage and current from switchgear trailer 40 to the actual working motor on pump trailer 60. The current increase occurs in an efficient manner within the electrical components of the pump trailer 60, with the trailer transformer 62 and the VFD 66 all in one package, in very short runs of cabling at that moment.

Figure 20:
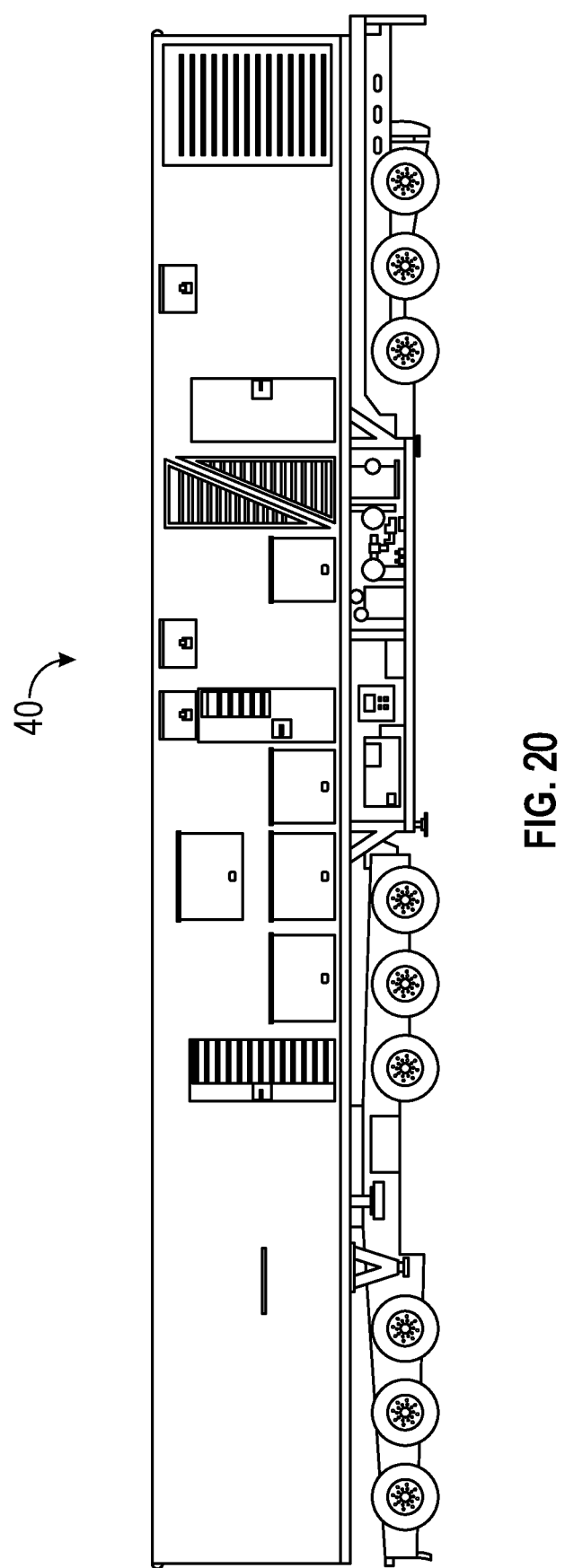
FIG. 20 is a side view of a turbine package capable of at least 36 MW, in accordance with certain illustrative embodiments described herein.

In the alternative embodiment of FIG. 20, the transformer on the MCC takes 13.8 KV and passes it through a 480-volt transformer and then feeds all of these auxiliary loads to power. In the event that 13.8 is lost, the 480-volt loads are still available. This power can be utilized to crank the turbine, and may send auxiliary power to the grid, the mobile substations and to move auxiliary lube oils, fans, and cooling fans on the frac pump trailers. So, the moment 13.8 KV is lost, the 40-volt black start generator can fire up Control System Various types of control systems can be provided for regulating various equipment and systems within the electric grid powered fractioning operation.

For example, in certain illustrative embodiments, a control system can be used energize power flow at the switchgear trailer 40. Each switchgear distribution is fitted with a CB or circuit breaker. To "energize" a particular distribution, a human operator or technician would close the air switch on the switchgear, which is a manual lever. At that moment, 13.8 KV power is sent to the primary side of the breaker, the circuit breaker. The operator can access the breaker at an HMI (human machine interface). There are multiple different places or locations within system 10 that the operator can control this breaker, such as a switchgear control house, where the HMI is located. For a switchgear having a plurality of distributions, the operator can engage a specific distribution at a "bay." The operator locates a bay to energize, and engages a close option. The HMI asks the operator to confirm that closing is desired. At that moment, the operator hits yes, and automatically the breaker closes. At that time, the HMI sends power to the main breaker on the frac pump trailer or blender. And at that same time, with the same HMI, the operator can go to frac pump 1 and hit close and the HMI will close the breaker on the frac pump trailer. Thus, in a first step, the operator first closes the air switch to the entirety of the CB, and then a second step, where from that point, the operator can power the equipment at the various "bays." This procedure provides a second "on/off" switch for equipment of system 10, at or near an HMI for switchgear trailer 40, which is after the initial "on/off switch" for system 10 at the initial connect location where electric grid power 20 is accessed. In certain illustrative embodiments, the air switch on the switchgear trailer 40 is human controlled. This is due to electrical governing bodies that may require a visible disconnect so that the operator can see that there is a physical disconnect between the connectors, or because of space considerations where an actuator may be too large or take up too much space in an enclosed area. In other embodiments, the switch can be automated or remotely operated.

In certain illustrative embodiments, a control system can be used to monitor, regulate, and manage power flow at the switchgear trailer 40. These functions are performed without the need for an automated controller. In certain embodiments, the controller can refer to a manual maintenance associated with the load of the frac pump spread. In other embodiments, the controller can refer to the constant monitoring of the power generation plant, where the power generation plant can respond to the load demand associated with maintenance frequency.

It is generally known in the art to use an automated controller to receive a total desired flow rate of fracturing fluid to be pumped, using the controller to calculate a total amount of electric power required to achieve the required total flow rate, using the controller to receive information associated with an amount of power available from the utility electric grid pull load based on the calculation, and then using the controller to direct a mobile substation connected to a utility electric grid to provide electric power to one or more electric motors.

However, there are a number of disadvantages to this known method. For example, the desired rate can take a constant switching of various power generation sources, which is an inefficient means for achieving the frac rate. In certain embodiments, the constant switching can delay achieving the desired rate on-demand and cause swings on the power grid in response to utilizing non-efficient VFDs. In certain embodiments, the utilization of non-efficient VFDs can cause harmonic distortion and/or voltage flicker by failing to meet regulatory standards.

By comparison, the presently disclosed system and method can provide the available power for maximum frac demand and allow the frac line to retrieve the desired load demand. In certain embodiments, the presently disclosed system and method can reach all frac loads demands at any time and eliminate all sync circuits and load sharing hardware needed to powered generation equipment, which is a more efficient process.

For example, and without limitation, the control system can be configured to regulate a plurality of electorally powered fracturing units in delivery of a treatment fluid from a source of treatment fluid to a wellbore, and the plurality of electrically powered fracturing units can be operatively associated with the utility electric grid, and can include at least one electric motor and at least one fluid pump coupled to the at least one electric motor, wherein the at least one electric motor is operatively coupled to a plurality of fracturing pumps and automatically controlled by at least one variable frequency drive.

Suitable controls and computer monitoring for the entire fracturing operation can take place at a single central location, which facilitates adherence to pre-set safety parameters. For example, a control center is indicated in a data van, where all frac operations are controlled and managed. In some embodiments, the control systems can remotely control operations of a plurality of maintenance trailers, a plurality of pump trailers, a plurality of auxiliary power units, a plurality of switchgear controls, and/or a plurality of frac pumps and blenders, from which operations can be managed via communications link. Examples of operations that can be controlled and monitored remotely from control center via communications link can be the breaker functionality of the system and method; the functionality of the frac pump and blenders; and the monitoring of the bus systems. This set-up is distinguishable from existing methods because known systems require a single point of operation without the complete visibility of the systems, operating platforms, and/or alarm logging/system health.

Blender

In certain illustrative embodiments as described herein, system can include one or more electrically powered blenders that are powered by utility electric grid 20. The electrically powered blender units can be modular in nature for housing on pump trailer 60, or housed independently. An electric blending operation permits greater accuracy and control of fracturing fluid additives. Blenders can be capable of providing fracturing fluid to pump 70 for delivery to the wellbore. In certain embodiments, blender module 40 can include at least one fluid additive source, at least one fluid source, and at least one centrifugal blender tub. Electric power can be supplied from utility electric grid 20 to blender module to effect blending of a fluid from fluid source with a fluid additive from fluid additive source to generate the fracturing fluid. In certain embodiments, the fluid from fluid source can be, for example, water, oils or methanol blends, and the fluid additive from fluid additive source can be, for example, friction reducers, gellents, gellent breakers or biocides.

Comparison Example

Table 2, shown below, compares and contrasts the operational and power requirements and capabilities for a grid-powered fracturing operation (as described herein) with those of an on-site powered fracturing operation, and demonstrates the advantages and efficiencies of the presently disclosed system and method.

TABLE 2

| Comparison of Operational/Power Requirements and Capabilities for Grid Powered Operation vs. On-Site Powered Operation | |
|---|---|
| Grid Powered Operation | On-Site Powered Operation |
| Mobile Substation | Gas Turbine |
| Uninterrupted Power | Power Fluctuates |
| Power On-Demand | Power On-Demand |

In Table 2, the "Grid Powered Operation" utilizes a plurality of mobile substations to supply power to the buss network to power all frac equipment and auxiliary support.

In contrast, the "On-Site Powered Operation" utilizes one or more gas turbines to supply power to the buss network to power all frac equipment and auxiliary support Thus, the "Grid Powered Operation" is a significantly more stable, constant power source that can provide uninterrupted power to the plurality of frac fleets and the plurality of auxiliary fleets.

Types of Operations

The presently disclosed system and method can be utilized for providing utility electrical power and delivering fracturing fluid to a wellbore at a fracturing operation. In a conventional fracturing operation, a "slurry" of fluids and additives is injected into a hydrocarbon bearing rock formation at a wellbore to propagate fracturing. Low pressure fluids are mixed with chemicals, sand, and, if necessary, acid, and then transferred at medium pressure and high rate to vertical and/or deviated portions of the wellbore via multiple high pressure, plunger style pumps driven by diesel fueled prime movers. For example, the plunger-style fluid pumps can be coupled to at least one magnet motor, and the at least one magnet motor and the plunger-style fluid pump can each be solely powered by power accessed from the utility electric grid. The majority of the fluids injected will be flowed back through the wellbore and recovered, while the sand will remain in the newly created fractures, thus "propping" the newly created fractures open and providing a permeable membrane for hydrocarbon fluids and gases to flow through so they may be recovered.

The treatment fluid provided for pressurized delivery to the wellbore can be continuous with the wellbore and with one or more components of the fracturing fleet, in certain illustrative embodiments. In these embodiments, continuous generally means that downhole hydrodynamics are dependent upon constant flow (rate and pressure) of the delivered fluids, and that there should not be any interruption in fluid flow during delivery to the wellbore if the fracture is to propagate as desired. However, it should not be interpreted to mean that operations of the fracturing fleet cannot generally be stopped and started, as would be understood by one of ordinary skill in the art. In certain illustrative embodiments, the treatment fluid can comprise a water-based fracturing fluid. In other illustrative embodiments, the treatment fluid can comprise a waterless liquefied petroleum gas (LPG) fracturing fluid, the use of which conserves water and can reduce formation damage caused by introducing water to the wellbore. In certain illustrative embodiments, the liquefied petroleum gas can comprise one or more gases from the group consisting of propane, butane, propylene and butylene. In other illustrative embodiments, the treatment fluid can suitably comprise, consist of, or consist essentially of: linear gelled water including but not limited to guar, hydroxypropyl guar ("HPG") and/or carboxymethylhydroxypropyl guar ("CMHPG"), gelled water including but not limited to guar/borate, HPG/borate, guar/zirconium, HPG/zirconium and/or CMHPG/zirconium, gelled oil, slick water, slick oil, poly emulsion, foam/emulsion including but not limited to $N_2$ foam, viscoelastic, and/or $CO_2$ emulsion, liquid $CO_2$, $N_2$, binary fluid ($CO_2/N_2$) and/or acid.

While the present description has specifically contemplated a fracturing system, the system and method can also be utilized in connection with other hydrocarbon-producing wellbore completions. For example, the system and method utilizing utility grid power as described herein can be used to power pumps for other purposes, or to power other oilfield equipment. High rate and pressure pumping equipment, hydraulic fracturing equipment, well stimulation pumping equipment and/or well servicing equipment could also be powered using the present system and method.

In addition, the system and method can be adapted for use in other art fields requiring high torque or high rate pumping operations, such as pipeline cleaning or dewatering mines. In certain embodiments, the system and method can use electrical power by utilizing the gird network to power a plurality of substations that can be moved from multiple locations to provide frac support via at least one cable providing power and communication.

Advantages

As discussed above, the electric grid powered fracturing operation described herein provides significant operational advantages and efficiencies over traditional fracturing systems.

For example, the presently disclosed system and method has significant ramp up efficiency when utility grid power is utilized. In general, utility grid power providers are very sensitive to loads that are being drawn from the grid as well as load rejection. Utility providers typically supply reactors, capacitors, filter banks, etc., so that if there is a large spike in load if power is cut off, or if there is a big draw in load, power is still available.

The presently disclosed system and method allow a user to load up a fracturing fleet and begin pumping with a gradual and manageable increase in load that supplies enough power to meets fracturing requirements, but does not negatively impact the utility electric grid. For example, pump trailer 60 is designed to deal with inductive loads that have a high end rush of current when they start to turn. For example, a 7,000 horsepower motor 68 on pump trailer 60 with a rate of at least 600-700 amps and an inductive load outside of a VFD 66 may experience at least 1,400 to 2,000 amps within the system 10. A larger cable comes off the secondary of the transformer lining which would be at about 2,100 volts going to a medium voltage 1,000 VFD 66 drive on pump trailer 60. At that moment, there is little to no current drawn when the VFD 66 is powered up. It is not until the electric motor on pump trailer 60 is turned, or until the VFD 66 is instructed to spin the electric motor at, e.g., 1 rpm, that a gradual increase in current is recognized, and maintained and managed by the VFD 66. The electric motor is operated at whatever rpm reference at full torque is desired at that moment, while managing the current voltage and frequency. As a result, on the primary side of the transformer on pump trailer 60, there is a very smooth increase in current which would be percentages less than what is seen on the secondary side of the transformer because as voltage increases, current decreases. For example, when the motor is pulling about 600 amps, the primary side of the transformer might only see 100-115 amps. This results in a system that is compatible with utilizing utility grid power.

The presently disclosed system and method also demonstrates desirable harmonics. Fracturing operations powered by a utility grid are required to stay within the IEEE standards of harmonics for power companies, or else the operators and utility companies could be subject to fines and penalties. The presently disclosed system and method is designed to minimize harmonics on the VFD to stay below approximately 5% harmonics while operating on utility grid power, and not tripping the utility grid. In certain illustrative embodiments, system 10 utilizes a pump trailer 60 with a 36-pulse drive on the VFD so that the switching is accelerated, as opposed to a 6 or 12 pulse drive, where the switching would be spaced out which can cause causes large and frequent voltage spikes on the grid and harmonic imbalance which can damage electrical components of the utility grid.

In certain embodiments, the VFD can meet all IEEE standards associated with THD and voltage flicker. In certain embodiments, the system can be enclosed to one frac unit encompassing a plurality of electrical components to achieve fracturing operations.

In certain illustrative embodiments, the system and method described herein can be used in connection with a system and method for use in fracturing underground formations using liquid petroleum gas, as described in U.S. Pat. No. 10,107,085, published Oct. 23, 2018, assigned to Typhon Technology Solutions, LLC, the contents and disclosure of which are incorporated by reference herein in their entirety.

It is to be understood that the subject matter herein is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A system for performing hydraulic fracturing using power from a utility electric grid via a power distribution pole, the system comprising:
    a mobile substation comprising at least two transformer units that are operatively coupled to the utility electric grid in a parallel orientation,
        wherein the transformer units are capable of receiving power from the utility electric grid and stepping down the power for delivery to a plurality of switchgears,
        wherein the power distribution pole provides at least 24.9 KV of power to the mobile substation,
        wherein the power distribution pole is connected to the mobile substation via at least two conductor cables;
    a plurality of electric motors,
        wherein each electric motor is operatively coupled to a hydraulic fracturing pump and operatively controlled by a variable frequency drive, and
        wherein each electric motor is coupled to one of the plurality of switchgears by at least one open air relay cable.

2. The system of claim 1, wherein the mobile substation is electrically synced to the at least two transformers and the plurality of switchgears.

3. The system of claim 1, wherein the at least two transformers units provide at least 30 MVA of power to the mobile substation.

4. The system of claim 1, wherein the plurality of switchgears allow for automatic transition between a normal buss operation and an emergency buss operation.

5. The system of claim 1, wherein the plurality of switchgears comprise a plurality of circuit breakers capable of providing 13.8 V of power to downstream equipment.

6. The system of claim 5, wherein the plurality of circuit breakers comprise at least one medium voltage circuit breaker.

7. The system of claim 1, wherein the at least two transformer units comprise at least one trailer transformer unit.

8. The system of claim 7, wherein the at least one trailer transformer unity is permanently fixed to a predetermined location.

9. The system of claim 7, wherein the at least one trailer transformer unit allows for dynamic addition of electric motors.

10. The system of claim 7, further comprising a motor control system connected to the at least one trailer transformer unit.

11. The system of claim 1, wherein the motor control system provides a 480 V side and a 13.8 V side encompassed in one unit associated with the plurality of switchgears.

12. A method comprising:
    receiving power from a utility electric grid via a power distribution pole;
    providing power to a plurality of equipment in parallel orientation utilizing a mobile substation,
        wherein the mobile substation comprises at least two transformer units that are operatively coupled to the utility electric grid,
        wherein the transformer units are capable of receiving power from the utility electric grid and stepping down the power for delivery to a plurality of switchgears,
        wherein the power distribution pole provides at least 24.9 KV of power to the mobile substation, wherein the power distribution pole is connected to the mobile substation via at least two conductor cables;

utilizing a plurality of electric motors to perform hydraulic fracturing, wherein each electric motor is operatively coupled to a hydraulic fracturing pump and operatively controlled by a variable frequency drive, and wherein each electric motor is coupled to one of the plurality of switchgears by at least one open air relay cable.

13. The method of claim 12, wherein the plurality of switchgears allow for automatic transition between a normal buss operation and an emergency buss operation.

14. The method of claim 12, wherein the plurality of switchgears comprise a plurality of circuit breakers capable of providing 13.8 V of power to downstream equipment.

15. The method of claim 14, wherein the plurality of circuit breakers comprise at least one medium voltage circuit breaker.

16. The method of claim 12, wherein the at least two transformer units comprise at least one trailer transformer unit.

17. The method of claim 16, wherein the at least one trailer transformer unity is permanently fixed to a predetermined location.

18. The method of claim 16, wherein the at least one trailer transformer unit allows for dynamic addition of electric motors.

19. The method of claim 16, further comprising utilizing a motor control system connected to the at least one trailer transformer unit automatically switch between a normal buss operation and an emergency buss operation.

20. The method of claim 19, wherein the motor control system provides a 480 V side and a 13.8 V side encompassed in one unit associated with the plurality of switchgears.

* * * * *